United States Patent
Nakagawa et al.

(10) Patent No.: US 9,647,524 B2
(45) Date of Patent: May 9, 2017

(54) LINEAR ACTUATOR

(75) Inventors: Hiroshi Nakagawa, Tokyo (JP); Takayoshi Fujii, Tokyo (JP); Takashi Fukunaga, Tokyo (JP); Yasuhiro Sakai, Tokyo (JP); Takashi Onoue, Tokyo (JP)

(73) Assignee: SINFONIA TECHNOLOGY CO., LTD., Tokyo (JP)

( * ) Notice: Subject to any disclaimer, the term of this patent is extended or adjusted under 35 U.S.C. 154(b) by 762 days.

(21) Appl. No.: 14/122,085

(22) PCT Filed: Apr. 2, 2012

(86) PCT No.: PCT/JP2012/058834
§ 371 (c)(1),
(2), (4) Date: Nov. 25, 2013

(87) PCT Pub. No.: WO2012/165031
PCT Pub. Date: Dec. 6, 2012

(65) Prior Publication Data
US 2014/0091645 A1    Apr. 3, 2014

(30) Foreign Application Priority Data

May 27, 2011  (JP) ................................ 2011-119330
May 27, 2011  (JP) ................................ 2011-119331

(51) Int. Cl.
H02K 33/16    (2006.01)
H02K 41/035   (2006.01)

(52) U.S. Cl.
CPC ........... *H02K 41/035* (2013.01); *H02K 33/16* (2013.01)

(58) Field of Classification Search
None
See application file for complete search history.

(56) References Cited

U.S. PATENT DOCUMENTS 2,043,790 A  *  6/1936  Baker .................... F16C 27/08
                                                              384/425
2011/0198945 A1   8/2011  Nakagawa et al.

FOREIGN PATENT DOCUMENTS

JP    64-007307 A    1/1989
JP    06-086571 A    3/1994
(Continued)

OTHER PUBLICATIONS

Chinese Office Action dated Aug. 13, 2015, issued in counterpart Chinese Patent Application No. 201280021213.1, (8 pages).
(Continued)

*Primary Examiner* — Thomas Truong
(74) *Attorney, Agent, or Firm* — Westerman, Hattori, Daniels & Adrian, LLP

(57) ABSTRACT

A linear actuator includes an inner core, and an outer core that is provided outside the inner core in a radial direction while being supported by a pair of flat springs. Permanent magnets are formed at one of the inner core and the outer core, and magnetic pole portions are formed at the other of the inner core and the outer core to face the permanent magnet with predetermined gaps formed therebetween. Spacers are respectively provided between the inner core and the flat springs, abutting portions are respectively configured by abutting facing surfaces of the spacers and the inner core and facing surfaces of the spacers and the flat springs adjacent to the spacers in the axial direction, and a plurality of engagement portions including recesses and protrusions are arranged at the abutting portions.

3 Claims, 16 Drawing Sheets

(56) References Cited

FOREIGN PATENT DOCUMENTS

| | | |
|---|---|---|
| JP | 2006-25533 A | 1/2006 |
| JP | 2007-135350 A | 5/2007 |
| JP | 4386149 B2 | 12/2009 |
| JP | 2010-104126 A | 5/2010 |
| JP | 2010-226874 A | 10/2010 |
| JP | 2010-279161 A | 12/2010 |
| JP | 2010-279162 A | 12/2010 |
| WO | 2010/047377 A1 | 4/2010 |

OTHER PUBLICATIONS

International Search Report of PCT/JP2012/058834, mailing date of Jun. 19, 2012.

* cited by examiner (a)

(b)

(a)

(b)

LINEAR ACTUATOR

TECHNICAL FIELD

The present invention relates to a linear actuator including flat springs for supporting an inner core and an outer core provided in a radial direction inside and outside in such a manner that the inner core and the outer core are disposed on the same axial center and for elastically supporting the outer core to reciprocate with respect to the inner core in an axial direction.

BACKGROUND ART

As a linear actuator in which a moving element is allowed to reciprocate with respect to a stator in one direction due to act of magnetism, many types of linear actuators have been conventionally known. Among them, a linear actuator having a configuration described in Patent Literature 1 described below is known.

This linear actuator is referred as an outer movable type in which a moving element is arranged outside a stator. In the linear actuator, the outer core as the moving element is disposed outside the inner core as the stator so that the outer core and the inner core are disposed on the same axial center. Further, permanent magnets are provided outside the inner core, and magnetic pole portions are provided inside the outer core. The permanent magnets are brought close on the magnetic pole portions with certain gaps formed therebetween, so that it is possible to electrically control and change a magnetic field formed between the permanent magnets and the magnetic pole portions. Accordingly, the outer core is allowed to reciprocate in a direction of the axial center.

A configuration of the linear actuator is specifically described. The inner core is supported, in a radial direction of the shaft, by a shaft passing through a through hole formed in the axial center of the inner core, and a pair of flat springs is provided at an outer circumference of the shaft so as to interpose the inner core in front and rear of the inner core. Further, the outer core is elastically supported with respect to the axial direction of the shaft by being connected from front and rear surfaces by the pair of flat springs. The flat springs are formed in an "8" shape when viewed in the axial direction of the shaft, and through holes are formed in crossing portions at centers of the flat springs. Thus, by simultaneously inserting the shaft into the through holes and through holes formed in the inner core, the inner core and the flat springs can be coaxially arranged, and the outer core connected to the flat springs, similarly to the inner core, can be coaxially arranged.

Moreover, a large diameter portion not being able to pass through the through hole is formed at a side of one end of the shaft, and a male screw is formed at a side of the other end. As described above, by screwing a nut to the screw after inserted into the through holes of the flat springs and the inner core, it is possible to fix positions of the flat springs and the inner core to the shaft.

In such a linear actuator, predetermined gaps are maintained while allowing the permanent magnets and the magnetic pole portions to appropriately face each other. This is important to maintain characteristics of the linear actuator. To achieve this, various techniques for restricting positional relation between the inner core and the outer core have been suggested.

For example, in the above-described Patent Literature 1, a groove is formed at an outer circumference of the flat spring, and an axial portion is formed at the outer core. By engaging the groove with the axial portion, a positional relation between the flat spring and the outer core is restricted, and a positional relation between the outer core and the inner core is indirectly restricted.

In addition, in Patent Literature 2, the shaft is formed in a polygonal shape, and the through holes of the inner core and the flat springs are formed in a polygonal shape to correspond to the shape of the shaft. Thus, via the shaft, a positional deviation in a circumferential direction between the inner core and the flat spring is suppressed. Accordingly, a positional relation between the inner core and the outer core is indirectly restricted.

Moreover, in Patent Literature 3, when there is a relative displacement in a radial direction between the inner core and the outer core, abutting portions which abut before the permanent magnets abut the magnetic pole portions and function as a stopper are formed between the inner core and the outer core. The positional relation between the inner core and the outer core in operation is also restricted by the abutting portions.

CITATION LIST

Patent Literature

[PTL 1] Japanese Patent Application Laid-open No. 2010-226874
[PTL 2] Japanese Patent Application Laid-open No. 2010-279161
[PTL 3] Japanese Patent Application Laid-open No. 2010-104126

SUMMARY OF INVENTION

Technical Problem

However, as in Patent Literature 1 and Patent Literature 3, while using the shaft having a cylindrical shape, when the shaft is inserted into the through holes of the flat springs and the inner core, and a nut is screwed to a front end of the shaft, rotational force applied to the nut is exerted to the flat springs, so that the position of the flat spring is likely to be deviated with respect to the inner core in the circumferential direction.

As stated above, when the positional deviation between the outer core and the inner core is caused, by changing the positional relation between the magnetic pole portions formed at the outer core and the permanent magnets formed at the inner core, there are problems that characteristics of the magnetic field are changed to change operational characteristics of the linear actuator.

In order to prevent the positional deviation at the time of assembling, it is considered that the assembling is carefully performed using an exclusive assembling tool. However, since cost is required to manufacture the tool and the number of assembling processes is increased, there is a concern that device cost is increased.

In addition, even though the assembling is performed so as not to cause the positional deviation in the circumferential direction between the outer core and the inner core, the nut is loosened due to the vibration at the time of driving, or a load in the circumferential direction is applied from the outside. Thus, the positional deviation in the circumferential direction is gradually caused, so that the characteristics are likely to change. Furthermore, when the positional deviation in the circumferential direction is remarkably caused, damage is likely to be generated by coming in the outer core contact with the inner core in the linear actuator.

As means for solving the problems, as in Patent Literature 2, it is considered that the positional deviation in the circumferential direction is suppressed by forming the shaft in a polygonal shape or by forming the shaft in a cylindrical shape, partially forming a key or a plane surface, and forming the flat springs and the inner core in a shape corresponding to the shape of the shaft. However, there is a concern that such a machining causes an increase in size of the device and an increase in manufacturing cost.

Further, as in Patent Literature 2, the shaft is formed in a polygonal shape, or the key or the plane surface is formed at a part of the cylindrical shape, the flat springs and the inner core fitted to the outer circumference of the shaft are formed in a shape corresponding to the shaft and the key or plane surface. By doing this, it is considered that the positional deviation in the circumferential direction is suppressed. However, there is a concern that such a machining causes an increase in manufacturing cost.

As means for fundamentally solving the positional deviations in the circumferential direction between the flat springs and the inner core at the time of assembling, a configuration can be considered such that the flat springs and the inner core are pressed in the axial direction of the shaft without using the screw at the time of assembling, so that the positions of the respective components are restricted. Specifically, configuration is such that while the flat springs and the inner core are inserted to the outer circumference of the shaft, an interference fit instead of the nut is provided at the front end of the shaft, and the fixing collar fixed by the interference fit is forcibly pressed in the axial direction by a means such as a hydraulic cylinder. In such a configuration, since the shaft does not require complicated machining such as a screw, a key groove, or a plane surface, for example, it is possible to obtain a simple and cheap configuration of the device, and to easily perform the assembling. Nevertheless, since force in the circumferential direction at the time of assembling does not act, the positional deviation between the flat spring and the inner core is not caused.

However, in such a configuration in which the fixing collar is forcibly pressed to the outer circumference of the shaft, the position restriction of the flat spring and the inner core in the axial direction by the fixing collar may be insufficiently performed depending on usage environment. Specifically, when the linear actuator is used under the condition with drastic changes in temperature and a temperature of the shaft is remarkably higher than a temperature of the inner core, the position of the fixing collar is relatively deviated with respect to the flat spring and the inner core by the extension of the shaft. In addition, when the temperature of the shaft is remarkably lower than the temperature of the inner core, the shaft is contracted in the axial direction, so that the position of the fixing collar is deviated.

In such a case, the position restriction of the inner core and the flat spring fitted to the outer circumference of the shaft in the axial direction is insufficiently performed to cause gaps. When such a situation occurs, when the outer core is operated with respect to the inner core, an operation stroke may be shortened or the responsiveness may be deteriorated by the gaps. In addition, since a supporting state of the flat spring is changed, device characteristics required as the linear actuator such as natural frequency may be changed.

In order to solve the aforementioned problems, an object of a first invention according to the present application is to provide a compact and inexpensive linear actuator with which it is possible to exhibit stable characteristics without causing a positional deviation in a circumferential direction between an inner core and an outer core and to easily perform assembling.

Furthermore, an object of a second invention according to the present application is to provide a linear actuator with which it is possible to simply assemble an inner core and an outer core without causing a deviation in a circumferential direction and to exhibit stable device characteristics even under a severe use condition with drastic changes in temperature.

Solution to Problem

The following measure has been devised as the present invention in order to achieve the above-described object.

That is, a linear actuator of a first invention includes an inner core, a pair of flat springs provided so as to interpose the inner core from front and rear of the inner core in an axial direction, and an outer core that is provided outside the inner core in a radial direction so as to be disposed on the same axial center as the inner core while being supported by the pair of flat springs. Permanent magnets are formed at one of the inner core and the outer core, and magnetic pole portions are formed at the other of the inner core and the outer core to face the permanent magnets with predetermined gaps formed therebetween. Spacers are respectively provided between the inner core and the flat springs, abutting portions are respectively configured by abutting facing surfaces of the spacers and the inner core and facing surfaces of the spacers and the flat springs adjacent to the spacers in the axial direction, and a plurality of engagement portions including recesses formed at one of the facing surfaces configuring the abutting portions and protrusions formed at the other of the facing surfaces are arranged at the abutting portions.

In such a configuration, the inner core, the spacers, and the flat springs are merely assembled in the axial direction while the recesses and the protrusions formed at the facing surfaces are engaged with each other, so that it is possible to decide a relative position without causing a positional deviation in a circumferential direction. For this reason, even when a shaft on which special machining for forming a key groove or a plane surface, for example, has been performed is not used, the relative positions of the outer core and the inner core supported by the flat springs are not deviated, from the time of assembly to its usage, in the circumferential direction. Thus, the magnetic pole portions and the permanent magnets can appropriately face each other, and the respective components can be prevented from being contacted within the linear actuator. Accordingly, it is possible to inexpensively provide the linear actuator exhibiting stable characteristics without causing a decrease in efficiency and a breakdown.

In addition, a linear actuator of the present invention includes an inner core, a pair of flat springs provided so as to interpose the inner core from front and rear of the inner core in an axial direction, and an outer core that is provided outside the inner core in a radial direction so as to be disposed on the same axial center as the inner core while being supported by the pair of flat springs. Permanent magnets are formed at one of the inner core and the outer core, magnetic pole portions are formed at the other of the inner core and the outer core to face the permanent magnets with predetermined gaps formed therebetween, and through holes are formed in the inner core and the pair of flat springs at positions of the same axial center. The linear actuator further includes a shaft that is closely inserted into each of the through holes; and spacers that are closely fitted to an outer circumference of the shaft and are respectively arranged between the inner core and the flat springs. Abutting portions are respectively formed by abutting facing surfaces of the spacers and the inner core and facing surfaces of the spacers and the flat springs adjacent to the spacers in the axial direction, and an engagement portion including recesses formed at one of the facing surfaces configuring the abutting portions and protrusions formed at the other of the facing surfaces is arranged at least one location of the abutting portions.

In such a configuration, while the inner core, the spacers, and the flat springs are fitted to the outer circumference of the shaft, the recesses and the protrusions formed at the facing surfaces of the inner core, the spacers, and the flat springs are merely engaged with each other, so that a relative position is decided so as not to cause a positional deviation in the circumferential direction. Thus, as described above, without performing special machining on the shaft, the relative positions of the inner core and the outer core supported by the flat springs are not deviated, from the time of assembly to its usage, in the circumferential direction. Thus, the magnetic pole portions and the permanent magnets can appropriately face each other, and the respective components can be prevented from being contacted within the linear actuator. Accordingly, it is possible to inexpensively provide the linear actuator exhibiting stable characteristics without causing a decrease in efficiency and a breakdown.

Further, in order to reduce the number of components to easily manage and assemble the components, at least any one of the spacers and the inner core are preferably configured to be integrated.

Furthermore, in order to more easily perform assembling and to generate strong fastening force in the engagement portions after the assembling, it is preferable to configure such that the protrusions and the recesses of the engagement portions be respectively formed as caulking projections and caulking holes, and the protrusions and the recesses be pressed in the axial direction while being engaged with each other to allow positions of the protrusions and the recesses to be mutually fixed.

Moreover, in order to simply form the engagement portions and to easily manufacture the respective components having the engagement portions, it is preferable to configure such that the inner core, the flat springs, and the spacers be formed by laminating the steel plates, and press marks or punched holes corresponding to the caulking projections or the caulking holes be formed at a part of each of the steel plates.

In addition, in order to further reduce manufacturing cost of the linear actuator having the above-described effect, it is further preferable to configure such that the permanent magnet is formed in a flat plate shape, and a facing surface of the magnetic pole portion facing the permanent magnet is formed to be flattened.

In addition, a linear actuator of a second invention includes an inner core, a pair of flat springs provided so as to interpose the inner core from front and rear of the inner core in an axial direction, and an outer core that is provided outside the inner core in a radial direction so as to be disposed on the same axial center as the inner core while being supported by the pair of flat springs. Permanent magnets are formed at one of the inner core and the outer core, and magnetic pole portions are formed at the other of the inner core and the outer core to face the permanent magnets with predetermined gaps formed therebetween. Through holes are formed in the inner core and the pair of flat springs at positions of the same axial center, a shaft having a large diameter portion formed at one end is closely inserted into the through holes from the other end, and a fixing collar is forcibly pressed into the other end protruding through the through holes in the axial direction, a spring member is provided at least one of between any one of the pair of flat springs and the large diameter portion, and between any one of the pair of flat springs and the fixing collar, and positions of the inner core and the pair of flat springs are restricted while applying urging force in the axial direction of the shaft by the spring member between the larger diameter portion and the fixing collar.

In such a configuration, it is possible to simply perform the assembling without causing the positional deviations in the circumferential direction between the inner core and the flat springs. Further, even when the shaft is extended by a change in temperature or the position of the fixing collar is deviated in the axial direction by contracting the shaft, the flat springs and the inner core can be continuously pressed in the axial direction by urging force due to the spring member. Accordingly, the gaps in the axial direction are not caused, and the supporting condition of the outer core due to the flat springs is hardly changed. Accordingly, it is possible to stably use the linear actuator without changing characteristics of the linear actuator even in using the linear actuator under harsh conditions with drastic changes in temperature.

In addition, in order to improve the aforementioned effect, it is preferable that the flat spring be uniformly supported over the entire circumferential direction. To achieve this, it is preferable that the spring member include a disc spring, and an inner circumference of the disc spring be fitted to an outer circumference of the shaft.

Further, in addition to the above-described effect, in order to achieve a compact configuration while having a stopper function in the radial direction to perform the position restriction between the permanent magnets and the magnetic pole portions, it is preferable to configure such that the outer core include stopper members at positions corresponding to the large diameter portion of the shaft and the fixing collar on both sides in the axial direction, the stopper members be provided with holes arranged with predetermined gaps formed between the stopper members and the outer circumferences of the large diameter portion and the fixing collar, and the predetermined gap be smaller than a gap between the permanent magnet and the magnetic pole.

In addition, when the stopper function is exhibited, in order to absorb the collision due to the contacting between the components and to continue the relative reciprocation operation with a small sliding resistance even at the time of contacting, the resin collar is preferably formed at least any one of the outer circumferences of the large diameter portion and the fixing collar and inner circumferences of the stopper members corresponding to the outer circumferences.

Moreover, in order to simply attach the resin collars and to reliably exhibit the stopper function even when the outer core is displaced in any direction, it is preferable to configure such that a cut portion be formed at one location of the resin collar in a circumferential direction to increase or decrease a diameter of the resin collar, the cut portion be inclined in relation to the axial direction, and at least a part configuring the resin collar be present at all locations in the circumferential direction.

Effects of Invention

According to the aforementioned first invention, it is possible to inexpensively provide a linear actuator with which it is possible to allow internal permanent magnets and magnet pole portions to appropriately face each other and exhibit stable characteristics without a decrease in efficiency or a breakdown since positional deviations between components are not caused while being capable of easily being assembled and having a simple configuration. In addition, according to the second invention, it is possible to provide a linear actuator with which it is possible to simply perform assembling without causing a positional deviation in a circumferential direction between an inner core and an outer core and to maintain stable operational characteristics since a supporting condition of the outer core does not change without forming internal gaps even under the environment with drastic changes in temperature.

DESCRIPTION OF EMBODIMENTS

An embodiment of the present invention will be explained below with referring to the figures.

First Embodiment

Figure 1:
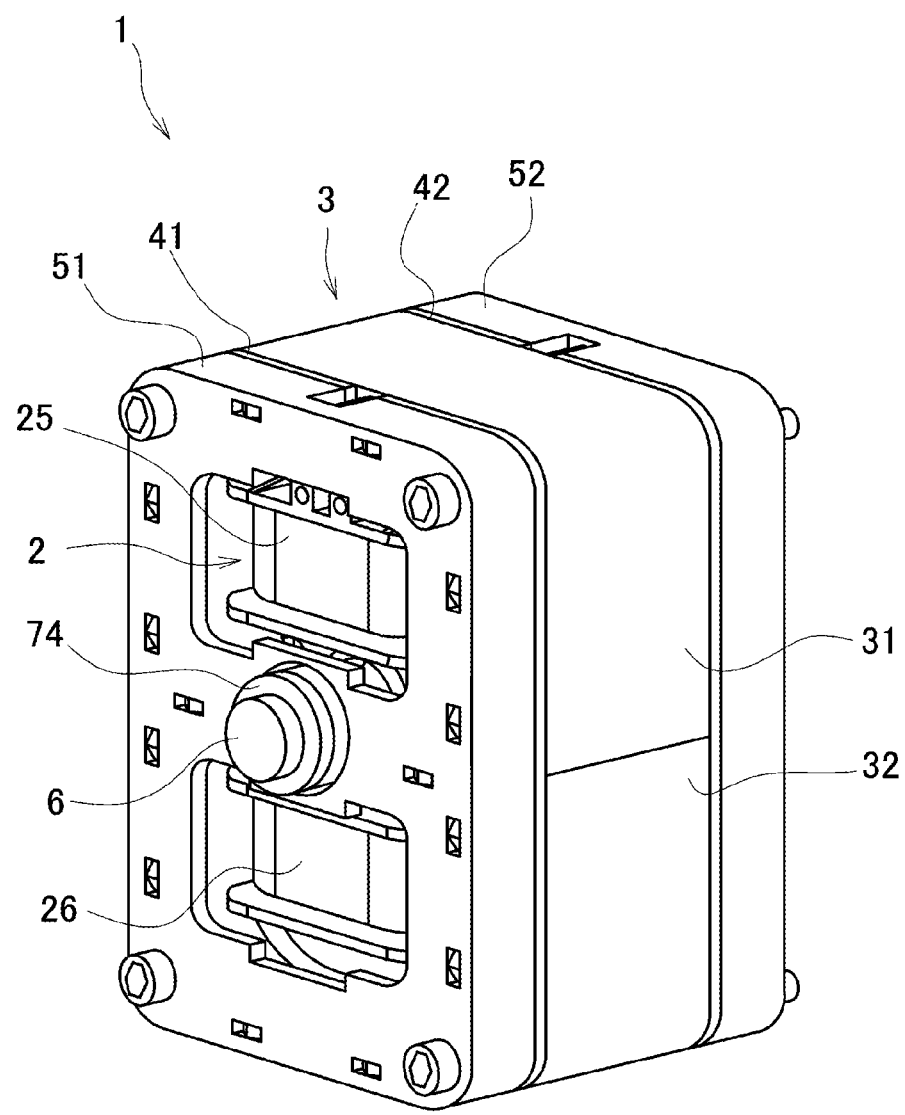
FIG. 1 is a perspective view of a linear actuator according to a first embodiment of the present invention.

As illustrated in FIG. 1, a linear actuator according to the present embodiment primarily includes an inner core 2 provided in the linear actuator, an outer core 3 provided at an outer circumference of the inner core 2 to be disposed on the same axial center as that of the inner core 2, a shaft 6 configuring the axial center, a pair of flat springs 41 and 42 which supports the outer core 3 at an outer circumference of the shaft 6, and stopper members 51 and 52 respectively provided in a front to back direction of the flat springs 41 and 42.

Figure 2:
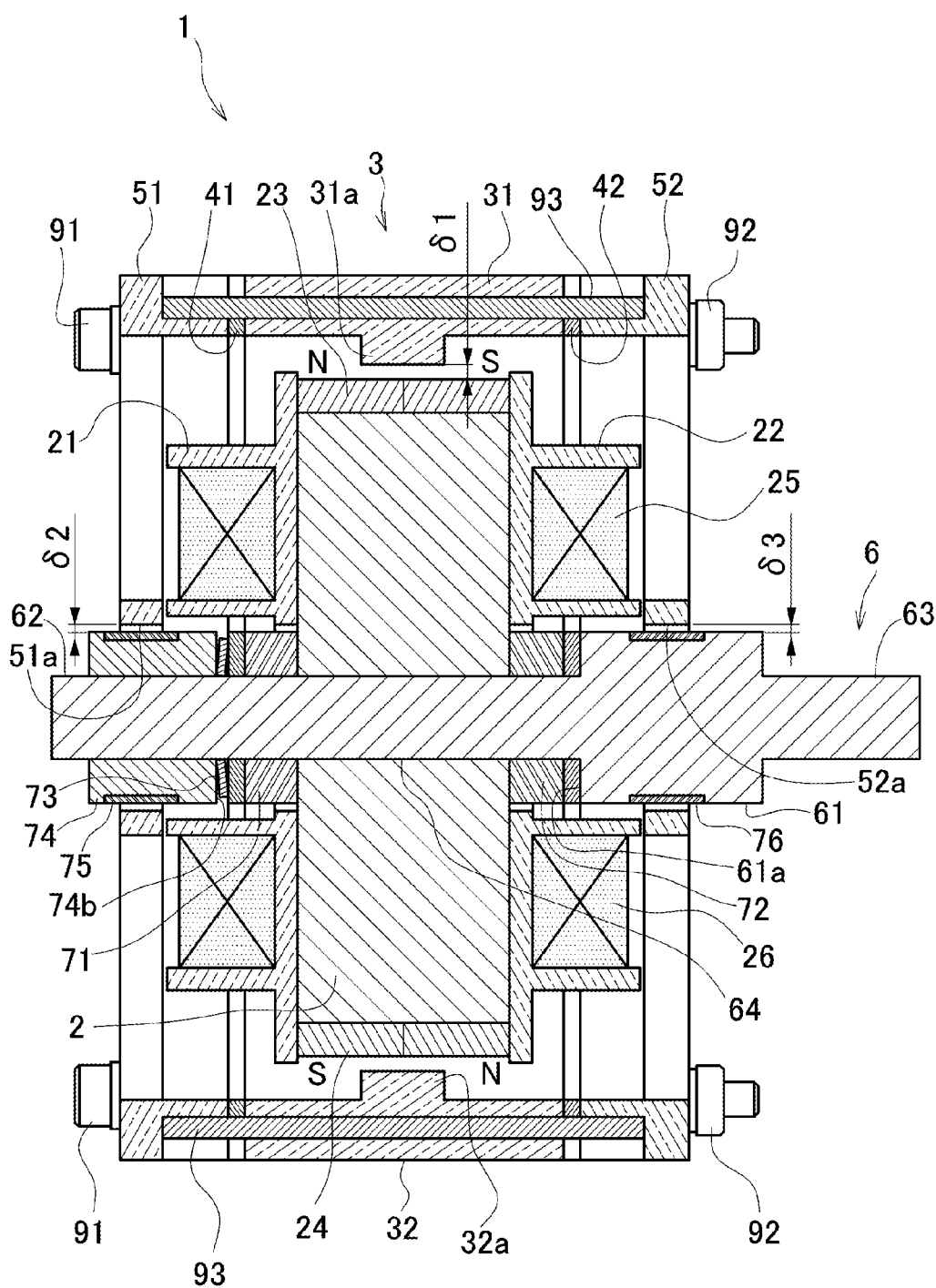
FIG. 2 is a cross-sectional view of the linear actuator.

Such a configuration will be described in detail with reference to a central cross-sectional view illustrated in FIG. 2.

The shaft 6 has a cylindrical shape that extends from a rear end 63 on a right side of the figure toward a front end 62 on a left side of the figure, and a large diameter portion 61 is formed so as to be close to the right side of the figure from a center in a longitudinal direction. An insertion portion 64 extending from an end surface 61a of the large diameter portion 61 to the front end 62 on the left side of the figure is inserted into the inner core 2 or the flat springs 41 and 42. The insertion portion 64 and the large diameter portion 61 are coaxially formed.

The flat spring 42, a spacer 72, the inner core 2, a spacer 71, and the flat spring 41 are sequentially fitted to the insertion portion 64 of the shaft 6, and a disc spring 73 serving as a spring member and a fixing collar 74 are fitted near the front end 62 of the shaft 6. By doing this, between an end surface 74b of the fixing collar 74 and the end surface 61a of the large diameter portion 61, positions of the flat springs 41 and 42 and the inner core 2 are restricted while being urged in an axial direction by the disc spring 73.

Here, in the description of the present embodiment, the axial direction means an axial direction in the shaft 6. Further, a radial direction and a circumferential direction mean a radial direction and a circumferential direction in the shaft 6, respectively. Here, the directions mean the same as directions centering about the axial center of the inner core 2 and the outer core 3. The definitions will be used in the following description unless otherwise stated.

The inner core 2 is made from laminated steel plates. Core covers 21 and 22 are respectively provided to interpose the inner core 2 in front and rear of the inner core in the axial direction, and coils 25 and 26 are provided outside the core covers 21 and 22. By applying current to the coils 25 and 26, a magnetic field can be generated in a vertical direction of the figure. Further, permanent magnets 23 and 24 are provided at the top and bottom of the inner core 2, and the permanent magnets 23 and 24 are arranged such that their magnetic poles are different from each other in the axial direction. Furthermore, the top and bottom permanent magnets 23 and 24 are arranged such that orientations of the magnetic poles are different from each other.

One end surfaces of the spacers 71 and 72 having a cylindrical shape abut on the front and rear of the inner core 2 in the axial direction to form an abutting portion. The other end surfaces of the spacers 71 and 72 abut on the flat springs 41 and 42 to form an abutting portion. The flat springs 71 and 72 extend up to the outer circumference of the inner core 2, and support the outer core 3 through guide pins 93.

The outer core 3 includes an upper core 31 and a lower core 32 which are formed by dividing into two in the vertical direction of the figure. Further, the guide pins 93 and 93 are inserted into the cores, respectively. Furthermore, a position of the outer core 3 is aligned in the radial direction through the flat springs 41 and 42 by using the guide pins 93 and 93. Moreover, the stopper members 51 and 52 are provided to interpose the outer core 3 in front and rear of the outer core 3 in the axial direction. Similarly to the outer core 3, positions of the stopper members 51 and 52 are aligned by using the guide pins 93 and 93. In addition, the members arranged as described above are fixed in the axial direction by using bolts 91 and 91 and nuts 92 and 92.

Hereinafter, shapes and configurations of the respective components illustrating the general configuration described above will be described in detail.

Figure 3:
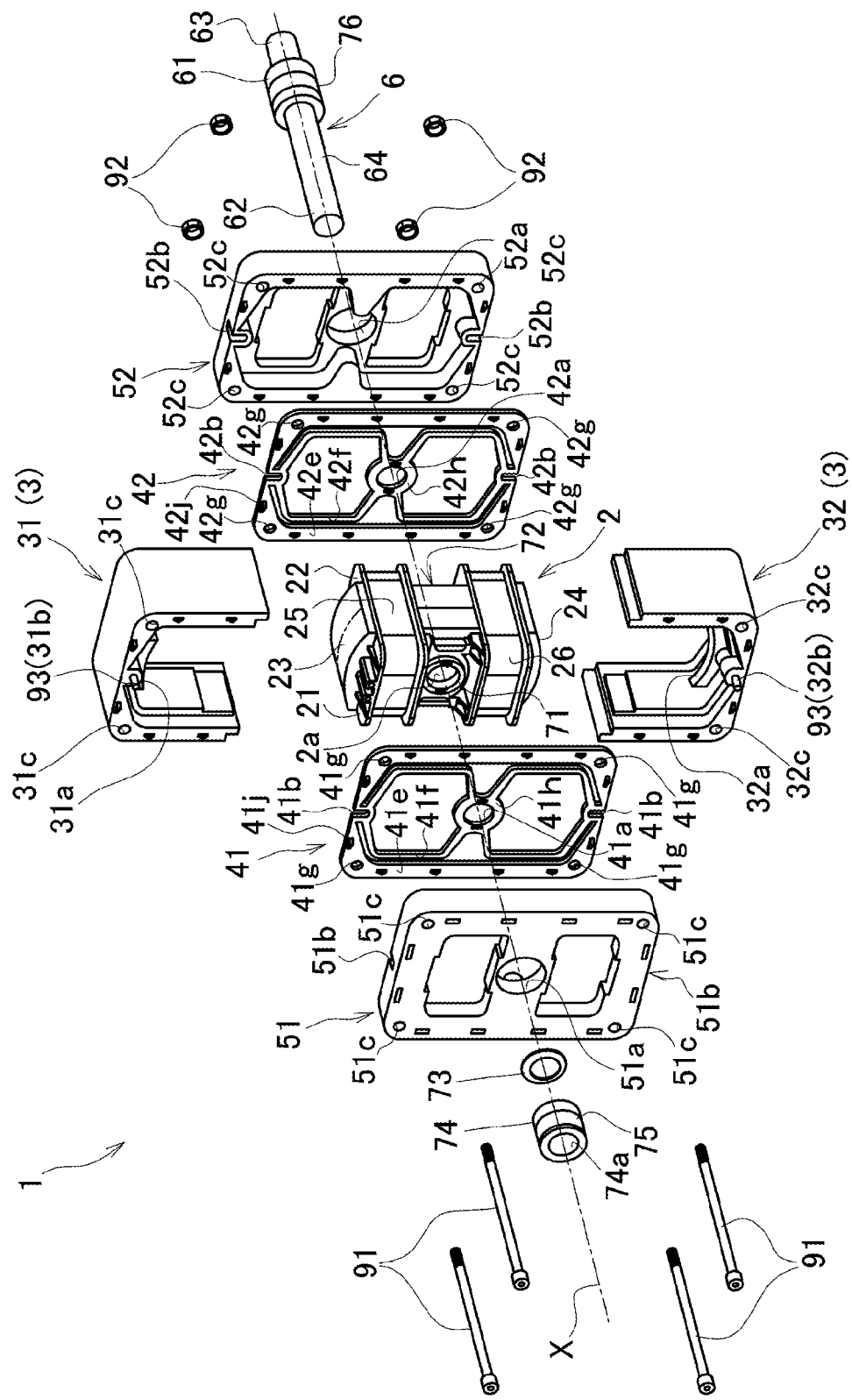
FIG. 3 is an exploded perspective view of the linear actuator.

The configurations between the components are described again with reference to an exploded perspective view illustrated in FIG. 3. The front and rear of the inner core 2 in the axial direction are interposed between the flat springs 41 and 42 through the spacers 71 and 72. Thereafter, the insertion portion 64 of the shaft 6 is inserted into a through hole 2a of the inner core 2 and through holes 41a and 42a of the flat springs 41 and 42. Subsequently, the disc spring 73 and the fixing collar 74 having a diameter larger than the through holes 2a, 41a, and 42a are fitted near the front end 62 of the shaft 6. By doing this, the inner core 2 and the flat springs 41 and 42 have the same axial center as an axial center X of the shaft 6. Thus, the positions of the inner core 2 and the flat springs 41 and 42 are aligned in the radial direction and in the axial direction.

Figure 4:
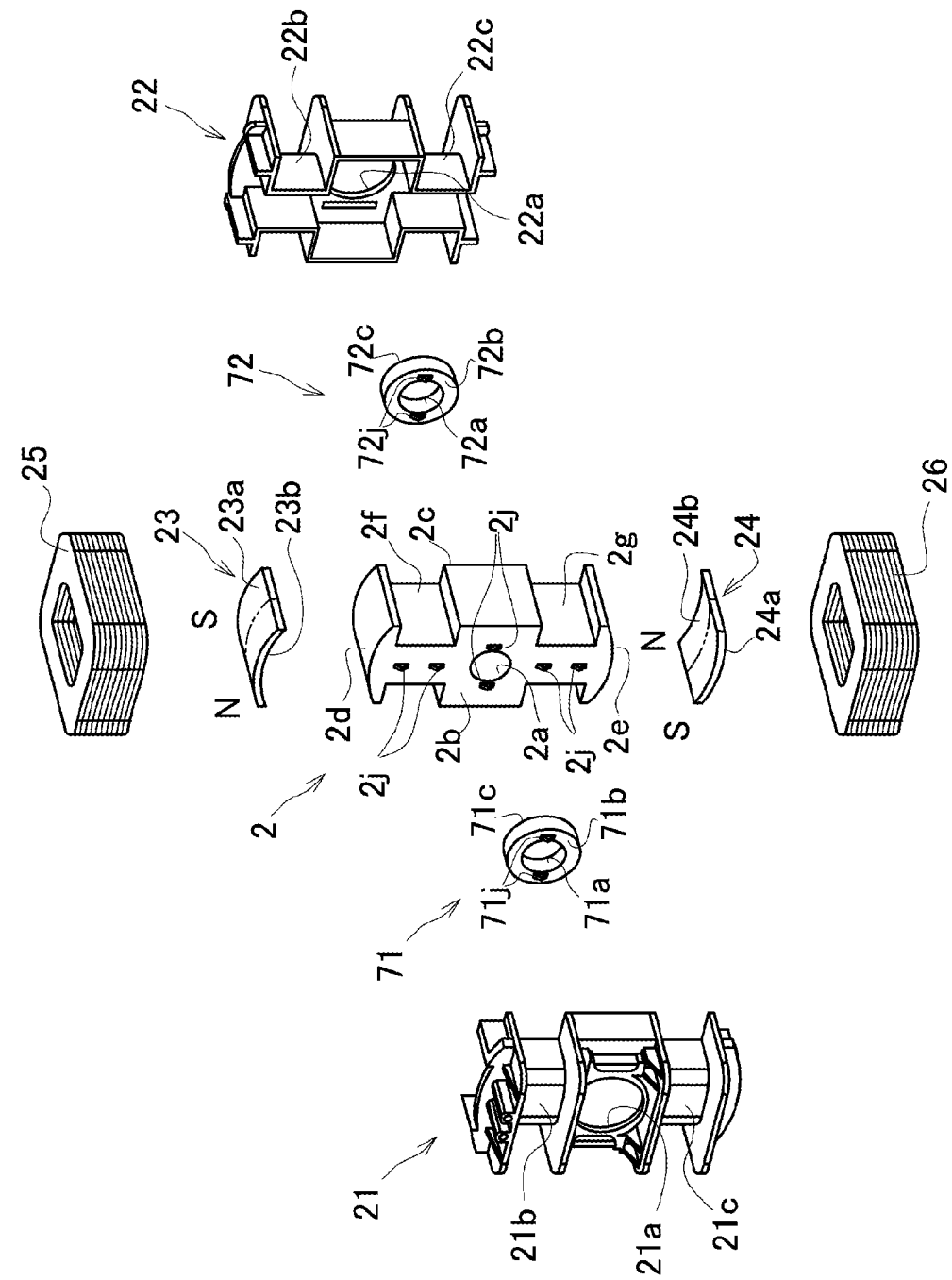
FIG. 4 is an exploded perspective view of a major part of the linear actuator.

Before the fitting to the outer circumference of the shaft 6 is performed as described above, peripheral components are attached to the inner core 2 as illustrated in FIG. 4. The inner core 2 is made from the laminated steel plates each having their axial directions as a thickness direction. As will be described below, the steel plates are integrated by being coupled from one another by caulking portions 2j formed at the respective steel plates. A front surface 2b and a rear surface 2c in the axial direction are flat surfaces. Further, the caulking portions 2j are formed at the front surface 2b as protrusions in the axial direction, and caulking portions (not shown) are formed at the rear surface 2c as recesses. Furthermore, the through hole 2a is formed in a center while penetrating the front surface 2b toward the rear surface 2c. Moreover, a top surface 2d and a bottom surface 2e are formed to become approximately curved surfaces along the circumferential direction. In addition, as recess portions around which the coils 25 and 26 are wound, step portions 2f and 2g are respectively formed at a position on a lower side of the top surface 2d and at a position on an upper side of the bottom surface 2e to be close to the through hole 2a.

The spacers 71 and 72, which have abutted on the inner core 2 so as to interpose the inner core 2 in the front and rear thereof in the axial direction, have cylindrical shapes, respectively. Further, similarly to the inner core 2, caulking portions 71j and 72j are also formed at the end surfaces of the spacers 71 and 72. For this reason, by engaging a part of the caulking portions formed at the inner core 2 with the caulking portions 71j and 72j of the spacers 71 and 72, when pressed in the axial direction, the positions of the inner core and the spacers 71 and 72 are mutually restricted.

Further, the core covers 21 and 22 are provided so as to interpose the inner core 2 in front and rear of the inner core 2 in the axial direction, so that the substantially entire inner core 2 is covered by the core covers 21 and 22. Opening holes 21a and 22a are formed in the core covers 21 and 22, respectively. Since the opening holes 21a and 22a have diameters larger than outer diameters of the spacers 71 and 72, the end surfaces 71b and 72c of the spacers 71 and 72 are completely exposed in the axial direction. As stated above, while the core covers 71 and 72 are attached to the inner core 2, the permanent magnetics 23 and 24 are attached to the inner core 2 at the top and bottom of the inner core. The permanent magnets 23 and 24 are each formed to become curved surfaces protruding outwards in the radial direction. Further, the permanent magnets 23 and 24 are attached to the inner core such that inner surfaces 23b and 24b come in contact with the top surface 2d or the bottom surface 2e of the inner core 2 while guided by the core covers 21 and 22. As described above, while attached to the inner core 2, outer surfaces 23a and 24a are formed to become curved surfaces that configure a part of a cylindrical surface centering about an axis of the through hole 2a.

In addition, while the core covers 21 and 22 are attached to the inner core 2, the coils 25 and 26 are formed at positions of step portions 21b, 21c, 22b and 22c of the core covers 21 and 22 corresponding to the step portions 2f and 2g of the inner core 2. By applying current to the coils 25 and 26, it is possible to change a magnetic field generated by the permanent magnets 23 and 24.

As described above, the inner core 2, the core covers 21 and 22, the spacers 71 and 72, the permanent magnets 23 and 24, and the coils 25 and 26 are assembled in advance, and then, on the basis thereof, the inner core assembly and other components are assembled as the linear actuator 1, as illustrated in FIG. 3.

The flat springs 41 and 42 are provided to be adjacent to the spacers 71 and 72, respectively. The flat springs 41 and 42 includes rectangular-shaped frame portions 41e and 42e, "8"-shaped spring portions 41f and 42f coupled to the frame portions 41e and 42e at upper and lower positions of the figure, and ring-shaped attachment portions 41h and 42h formed at centers thereof. In such a configuration, when the attachment portions 41h and 42h are fixed, the spring portions 41f and 42f are deformed, so that the frame portions 41e and 42e can be elastically displaced in the axial direction. One end surfaces of the attachment portions 41h and 42h abut on the spacers 71 and 72, and thus the positions of the flat springs 41 and 42 are aligned in the axial direction. Further, the through holes 41a and 42a formed in centers of the attachment portions 41h and 42h are arranged on the same axis as the through hole 2a of the inner core 2, and then the shaft 6 is inserted into the through holes. Cutoff portions 41b, 41b, 42b, and 42b are formed at the upper and lower positions of the frame portions 41e and 42e of the flat springs 41 and 42 in the figure so as to be in line with a center of the through hole 41a. When assembling them, the guide pins 93 and 93 are inserted along the cutoff portions 41b, 41b, 42b, and 42b at the top and bottom of the figure, so that the positions of the upper core 31 and the lower core 32 are aligned. Furthermore, bolt holes 41g to 41g and 42g to 42g are formed in four corners of the frame portions 41 and 42, and bolts 91 to 91 are inserted into the bolt holes 41g to 41g and 42g to 42g at the final assembling step.

Figure 8:
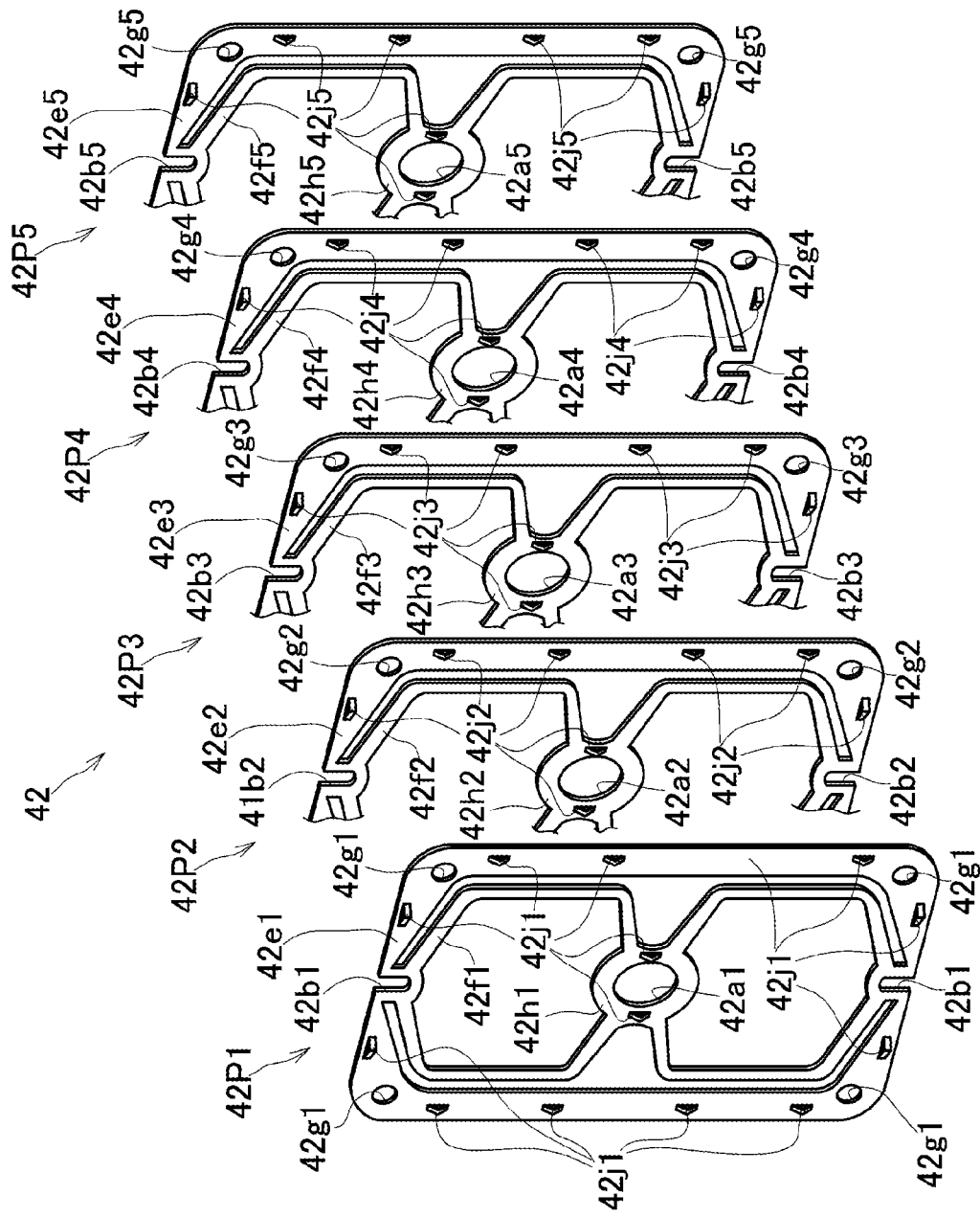
FIG. 8 is an exploded perspective view of a flat spring configuring the linear actuator.

Hereinafter, in order to describe a detailed configuration of the flat springs 41 and 42, the flat spring 42 will be described as an example. As illustrated in FIG. 8, the flat spring 42 is formed by laminating steel plates for a flat spring 42P1 to 42P5 formed through punching and mutually coupling the steel plates. The steel plates for a flat spring 42P1 to 42P5 are formed to have the same shape as a whole. After the steel plates laminated, bolt holes 42g1 to 42g5, cutoff portions 42b1 to 42b5, and through holes 42a1 to 42a5, which are formed at the respective steel plates, are integrated, so that one bolt hole 42g, one cutoff portion 42b, and one through hole 42a are configured as illustrated in FIG. 3.

Twelve caulking portions 42j1 to 42j5 are respectively formed at frame portions 42e1 to 42e5 in the circumferential direction, and two caulking portions 42j1 to 42j5 are respectively formed at attachment portions 42h1 to 42h5 in left and right directions of the figure. The caulking portions 42j1 to 42j5 are formed through pressing to each have a reverse "V"-shaped cross section, and protrude toward the left direction of the figure. For this reason, recesses are formed to correspond to the protrusions at a rear surface of the surface at which the protrusions are formed. Thus, positions of the caulking portions 42*j*1 to 42*j*5 having such shapes are adjusted to overlap each other, so that it is possible to engage the recesses with the protrusions. Thus, by applying pressing force to the laminated thin plates described above by a press machine, for example, in a laminated direction, the caulking portions 42*j*1 to 42*j*5 are slightly deformed to be strongly connected to each other, so that the caulking portions 42*j*1 to 42*j*5 are integrated.

In the present embodiment, the flat spring 41 illustrated in FIG. 3 has substantially the same configuration as that of the flat spring 42 having the configuration described above. However, in order not to generate protrusions on a contacting surface with the disc spring 73 adjacent to the flat spring 41, only the contacting surface is formed to become flat. A specific method for flattening the contacting surfaces will be described below.

As illustrated in FIG. 3, after the flat springs 41 and 42 having the configuration described above are arranged so as to interpose the inner core 2 through the spacers 71 and 72, the shaft 6 is inserted into the centers of the spacers 71 and 72 and the inner core 2. The core covers 21 and 22, the permanent magnets 23 and 24, and the coils 25 and 26 have been previously attached to the inner core 2 as described above.

Figure 5:
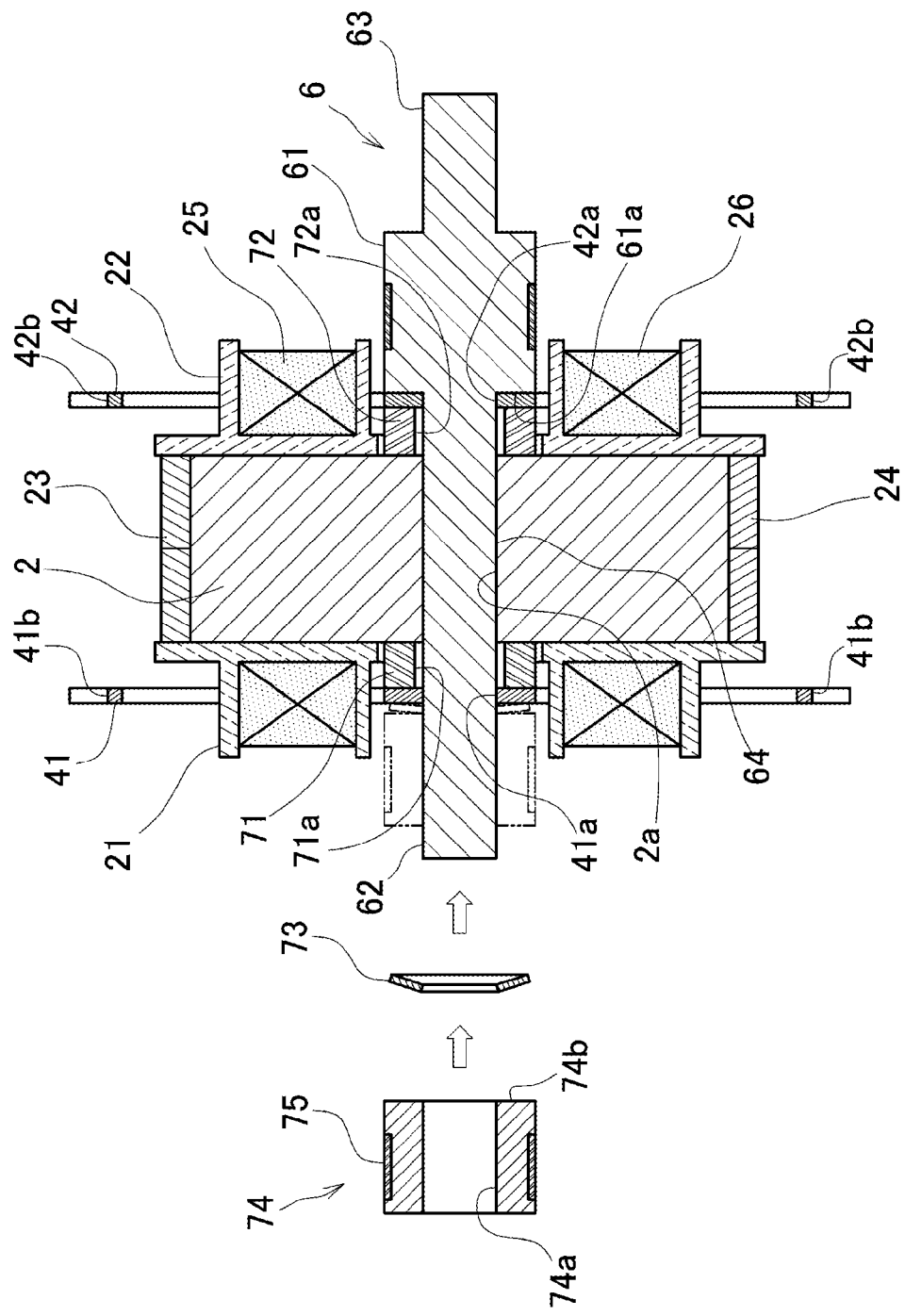
FIG. 5 is a cross-sectional view illustrating a method of assembling the major part of the linear actuator.

In this way, when the assembly is finished, a shape illustrated in FIG. 5 is obtained. With the inner core 2 as the center, the flat spring 41, the spacer 71, the inner core 2, the spacer 72, and the flat spring 42 are sequentially arranged from the left direction of the figure. The insertion portion 64 of the shaft 6 is inserted into the through holes 41*a*, 71*a*, 2*a*, 72*a*, and 42*a* that are respectively formed in the centers of the flat springs 41 and 42, the spacers 71 and 72, and the inner core 2. Thereafter, portions from the end surface 61*a* of the large diameter portion 61 to the flat spring 41 on the left side of the figure abut sequentially on the shaft in the axial direction.

Figure 11:
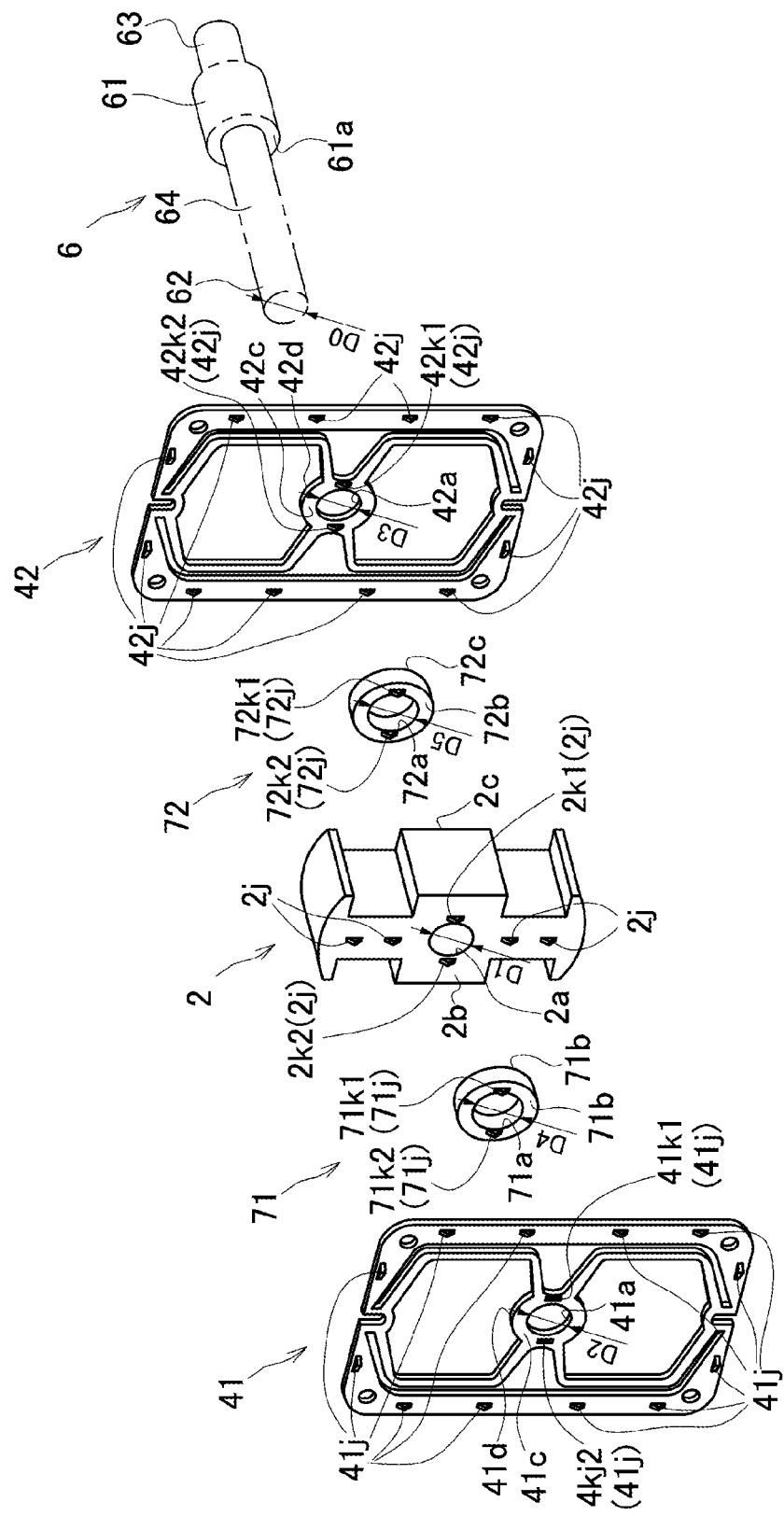
FIG. 11 is a perspective view illustrating an engagement relation between components of the linear actuator.

As described above, a positional relation of engagement portions at the abutting portions of the respective components at the time of assembling will be described with reference to FIG. 11.

When inner diameters of the through holes 2*a*, 41*a*, 42*a*, 71*a*, and 72*a* of the inner core 2, the flat springs 41 and 42, and the spacers 71 and 72, which are fitted to the insertion portion 64 of the shaft 6, are represented by D1 to D5, the inner diameters D1 to D5 are set to have the following relations to an outer diameter D0 of the shaft insertion portion 64.

That is, the inner diameters D1, D2, and D3 are substantially equal to the outer diameter D0, and thus the shaft 6 can be inserted smoothly and closely. Thus, by only inserting the shaft 6, the positions of the inner core 2 and the flat springs 41 and 42 are restricted in the radial direction. Meanwhile, D4 and D5 are set to be slightly larger than the inner diameters D1, D2, and D3 to an extent that looseness therebetween does not occur.

Furthermore, the inner core 2 includes six caulking portions 2*j* to 2*j* at the front surface 2*b* and the rear surface 2*c*, respectively. The protrusions as the caulking projections are formed at the front surface 2*b*, and the recesses as caulking holes are formed at the rear surface 2*c*. Among the caulking portions 2*j* to 2*j*, two caulking portions 2*k*1 and 2*k*2 formed near the through hole 2*a* act as engagement portions with the spacers 71 and 72 adjacent to the inner core 2.

Moreover, two caulking portions 71*k*1 (71*j*) and 71*k*2 (71*j*) are also formed at the spacer 71 to correspond to the caulking portions 2*k*1 and 2*k*2 formed at the inner core 2, and protrusions as the caulking projections and recesses as the caulking holes are respectively formed at a front surface 71*a* and a rear surface 71*b*. Similarly, two caulking portions 72*k*1 (72*j*) and 72*k*2 (72*j*) are also formed at the spacer 72 to correspond to the caulking portions 2*k*1 and 2*k*2 of the inner core 2, and protrusions as the caulking projections and recesses portions as the caulking holes are respectively formed at a front surface 72*a* and a rear surface 72*b*.

In addition, the flat springs 41 and 42 also include 14 caulking portions 41*j* to 41*j* and 42*j* to 42*j*. Among them, the caulking portions 41*k*1, 41*k*2, 42*k*1, and 42*k*2 near the through holes 41*a* and 42*a* are formed to correspond to the caulking portions 71*k*1, 71*k*2, 72*k*1, and 72*k*2 of the spacers 71 and 72 to be engaged with each other. The caulking portions 42*k*1 and 42*k*2 of the flat spring 42 are formed such that the recesses as the caulking holes are formed at an attachment-portion rear surface 42*d* and the protrusions as the caulking projections are formed at the attachment-portion front surface 42*c*. Meanwhile, the caulking portions 41*k*1 and 41*k*2 of the flat spring 41 are formed such that the recesses as the caulking holes are formed at an attachment-portion rear surface 41*d* and the protrusions as the caulking projections are not formed at the attachment-portion front surface 41*c*. That is, the caulking portions do not protrude outwards from the attachment-portion front surface.

As described above, the protrusions and the recesses are formed at the respective surfaces perpendicular to the axial direction, and when the respective surfaces abut each other, the protrusions and the recesses are engaged with each other. Specifically, the front surface 2*b* of the inner core 2 and the rear surface 71*b* of the spacer 71, which face each other, abut each other in the axial direction to form abutting portions. Further, the protrusions as the caulking portions 2*k*1 and 2*k*2 formed at the front surface 2*b* of the inner core 2 are engaged with the recesses as the caulking portions 71*k*1 and 71*k*2 formed at the rear surface 71*b* of the spacer 71. In the abutting portions formed in this manner, two engagement portions are present, so that the position in the circumferential direction is reliably restricted.

Similarly, an abutting portion formed by the front surface 71*b* of the spacer 71 and the attachment-portion rear surface 41*d* of the flat spring 41 that face each other, an abutting portion formed by the rear surface 2*c* of the inner core 2 and the front surface 72*b* of the spacer 72, and an abutting portion formed by the rear surface 72*c* of the spacer 72 and the attachment-portion front surface 42*c* of the flat spring 42 have two engagement portions including the recesses and the protrusions. Thus, the position in the circumferential direction is restricted at the abutting portions.

By inserting the insertion portion 64 of the shaft 6 into the respective components including the caulking portions that performs the aforementioned position restriction in the circumferential direction, the state illustrated in FIG. 5 is achieved. The spacers 71 and 72 each have the inner diameter slightly larger than the outer diameter of the insertion portion 64 of the shaft 6. However, in the process of performing the engaging in the axial direction as described above, the centering is automatically performed.

After such a state is achieved, the disc spring 73 as a spring member and the fixing collar 74 are fitted to the insertion portion 64 of the shaft 6. A through hole 74*a* formed in a center of the fixing collar 74 has an inner diameter slightly smaller than the outer diameter of the insertion portion 64 of the shaft 6. The fixing collar 74 is forcibly pressed in the right direction of the figure from the front end 62 of the shaft 6 by using a hydraulic cylinder, for example. In this way, after forcibly pressed, an outer circumferential surface of the insertion portion 64 is held by an inner circumferential surface of the through hole 74a, so that the position is firmly fixed.

It is only pressing the fixing collar in the axial direction to forcibly press the fixing collar 74, and since force in the circumferential direction does not act as in a case where a screw is screwed, the positions of the respective components are not deviated in the circumferential direction at the time of assembling. Accordingly, it is possible to easily assemble the components without paying particular attention to the assembly, and it is also possible to reduce assembly problem.

Since an outer diameter of the fixing collar 74 is larger than the through holes 2a, 71a, 72a, 41a, and 42a of the inner core 2, the spacers 71 and 72, and the flat springs 41 and 42, the fixing collar 74 functions as a position restricting member in the axial direction. That is, the positions of the inner core 2, the spacers 71 and 72, and the flat springs 41 and 42 in the axial direction are restricted between the end surface 74b of the fixing collar 74 and the end surface 61a of the large diameter portion 61. When the fixing collar 74 is forcibly pressed as described above, since the disc spring 73 is deformed to be contracted in the axial direction, a restoring force of the disc spring 73 constantly acts on the inner core 2, the spacers 71 and 72, and the flat springs 41 and 42 in the axial direction. For this reason, by positional deviation of the fixing collar 74 in the axial direction due to thermal contraction of the shaft 6 or thermal expansion of the shaft 6, even when relative positions of the inner core 2, the spacers 71 and 72, and the flat springs 41 and 42 in the axial direction with respect to the fixing collar 74 are changed, it is possible to restore a shape of the disc spring 73 so as not to generate gaps and to exert urging force in the axial direction to the inner core 2, the spacers 71 and 72, and the flat springs 41 and 42 in the axial direction without being constantly changed. Thus, it is possible to prevent a gap from being generated in the axial direction at the outer circumference of the shaft 6 and not to change a supporting condition of the flat springs 41 and 42. Accordingly, even when the linear actuator is used under the severe condition with drastic changes in temperature, characteristics of the linear actuator 1 are hardly changed.

Further, by using the disc spring 73 serving as a spring member for exerting the urging force in the axial direction to the inner core 2, and the spacers 71 and 72, and the flat springs 41 and 42, an inner circumferential surface of the disc spring 73 is merely fitted to the outer circumference of the shaft 6, so that it is possible to easily support the flat springs 41 and 42 with good position accuracy and to uniformly exert the urging force in the circumferential direction. For this reason, it is possible to uniformly support the flat springs 41 and 42 over the entire circumference without being biased in a certain direction, so that the characteristics of the linear actuator 1 can be further stabilized.

In addition, the caulking portions 2k1, 2k2, 71k1, 71k2, 72k1, 72k2, 41k1, 41k2, 42k1, and 42k2 (see FIG. 11), which perform the position restriction in the circumferential direction and serve as the engagement portions including the recesses and the protrusions formed at the abutting portions, are used as combinations of the caulking projections and the caulking holes. Accordingly, small deformation occurs when the fixing collar 74 is forcibly pressed to the shaft 6, so that it is possible to generate strong fastening force. Therefore, the inner core 2, the spacers 71 and 72, and the flat springs 41 and 42 are integrated without mutually causing positional deviation in the circumferential direction.

In the assembling process described above, it has been described that after the inner core 2, the spacers 71 and 72, and the flat springs 41 and 42 are fitted to the insertion portion 64 of the shaft 6, the inner core 2, the spacers 71 and 72, and the flat springs 41 and 42 are mutually fastened by pressing force at the time of forcibly pressing the fixing collar 74. However, it may be possible to integrate the respective components adjacent to each other by using the caulking portions in a step before the components are fitted to the insertion portion 64 of the shaft 6. For example, any one of the spacers 71 and 72 or both the spacers 71 and 72 are preferably coupled to the inner core 2 by using the caulking portions to be integrated. By doing this, it is possible to reduce the number of components. As a result, it is possible to easily manage and assemble the components.

As stated above, the inner core 2, the spacers 71 and 72, the flat springs 41 and 42, the disc spring 73, and the fixing collar 74 are assembled with respect to the shaft 6 as a reference. Thereafter, in the state illustrated in FIG. 3, the upper core 31 and the lower core 32 are attached from the top and bottom of the figure to configure the outer core 3. The outer core 3 formed by the upper core 31 and the lower core 32 is provided outside the inner core 2 in the radial direction to surround the inner core 2, and is interposed, between the frame portions 41e and 42e of the flat springs 41 and 42, in the axial direction. Magnetic pole portions 31a and 32a are formed at an inner surface of the outer core 3, and are respectively provided to face the permanent magnets 23 and 24 with appropriate gaps formed therebetween. The guide pins 93 and 93 are respectively formed at the upper core 31 and the lower core 32 so as to be inserted into pin holes 31b and 32b formed outside the magnetic pole portions 31a and 32a. Further, by inserting the guide pins 93 into the cutoff portions 41b and 42b formed at the above-described flat springs 41 and 42, it is possible to assemble the components while positioning the components.

Since a positioning function using the guide pins 93 is exhibited, it is possible to perform exact positioning the outer core 3 and the inner core so as to be disposed on the same axial center X at the time of assembling. Furthermore, it is possible to prevent damage caused by a collision of the permanent magnets 23 and 24 and the magnetic pole portions 31a and 32a. Moreover, it is possible to form appropriate gaps between the permanent magnets 23 and 24 and the magnetic pole portions 31a and 32a. In addition, in the upper core 31 and the lower core 32, through holes 31c, 31c, 32c, and 32c are formed at a position corresponding to the bolt holes 41g to 41g and 42g to 42g respectively formed in the flat springs 41 and 42. Accordingly, it is possible to insert the bolts 91 to 91 into the holes at the final assembling step.

The upper core 31 and the lower core 32 having such shapes have specifically the following configurations. Hereinafter, the upper core 31 will be described as a typical example.

Figure 6:
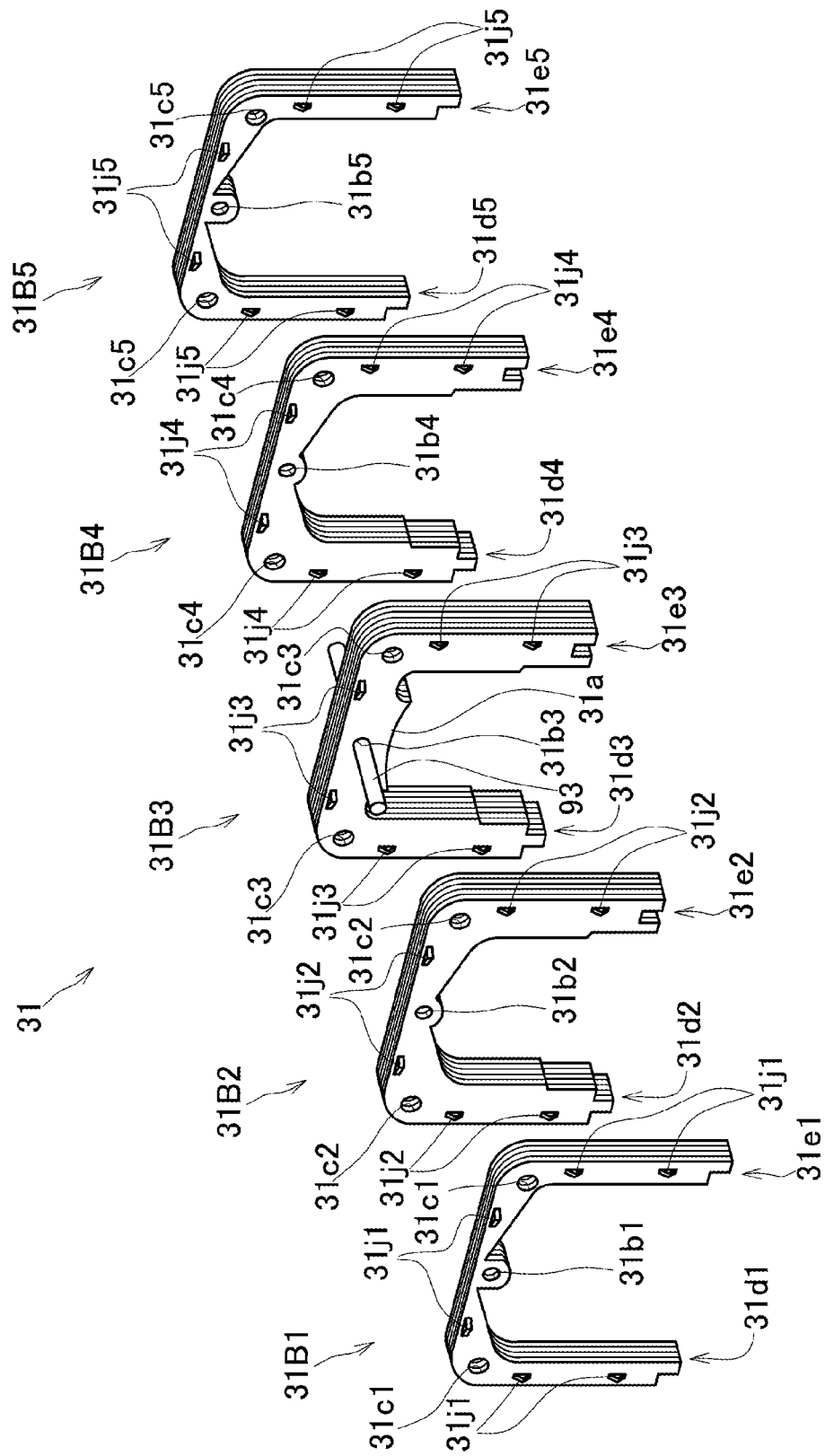
FIG. 6 is an exploded perspective view of an outer core configuring the linear actuator.

The upper core 31 has the configuration illustrated in FIG. 6, and is formed by integrating five core elements 31B1 to 31B5 arranged in the axial direction. The core elements 31B1 to 31B5 are each formed in a "U" shape, and are formed by laminating thin steel plates formed through punching. A method for coupling these thin plates is the same as the fastening method using the caulking portions 42j1 to 42j5 formed at the respective portions of the thin plates 42P1 to 42P5 in FIG. 8 which describes with using the flat spring 42 as an example.

Referring again to FIG. 6, the respective portions of the core elements 31B1 to 31B5 have caulking portions 31j1 to 31j5. Further, since the caulking portions 31j1 to 31j5 are formed as protrusions toward the left direction of the figure and are formed as recesses toward the right direction, when the core elements 31B1 to 31B5 are overlapped with each other, the caulking portions 31j1 to 31j5 are engaged with each other, so that the position restriction is performed. Further, bolt holes 31c1 to 31c5 and pin holes 31b1 to 31b5 are respectively formed in the core elements 31B1 to 31B5. Thus, when the core elements 31B1 to 31B5 are connected to integrally configure the upper core 31, the upper core 31 includes the bolt holes 31c and the pin holes 31b, respectively. The guide pins 93 are inserted into the pin holes 31b in the axial direction, and thus both ends of the guide pins 93 protrude from the upper core 31. Furthermore, step portions 31d1 to 31d5 and 31e1 to 31e5 are respectively formed at both U-shaped ends of the core elements 31B1 to 31B5. Thus, after the step portions are integrated as the upper core 31, the step portions are meshed with the same portions of the lower core 32 (see FIG. 3).

In the present embodiment, the lower core 32 illustrated in FIG. 3 has the same shape as the upper core 31 having the configuration described above, and is used by vertically inverting the upper core 31.

Referring again to FIG. 3, after the upper core 31 and the lower core 32 are arranged between the flat springs 41 and 42 while the upper and lower cores are positioned by the guide pins 93 and 93, the stopper members 51 and 52 are assembled so as to interpose the upper and lower cores from the outside in the axial direction. The stopper members 51 and 52 are formed to have an external form of a rectangular shape, and have substantially the same external form as the flat springs 41 and 42 and the outer core 3. The stopper members 51 and 52 include grooves 51b, 51b, 52b, and 52b at the top and bottom of the figure. The grooves are fitted to the both ends of the guide pins 93 and 93 protruding in the axial direction from the outer core 3, so that the positioning is performed. Accordingly, similarly to the outer core 3, the stopper members 51 and 52 have the same central axis as the axial center X of the shaft 6.

The stopper members 51 and 52 are formed in an "8" shape, and holes 51a and 52a are formed in their centers. Thus, inner diameters of the holes 51a and 52a of the stopper members 51 and 52 are set to be slightly larger than the outer diameters of the fixing collar 74 and the large diameter portion 61 of the shaft 6. For this reason, the fixing collar 74 and the large diameter portion 61 do not interfere with the holes 51a and 52a. Moreover, bolt holes 51c to 51c and 52c to 52c are respectively formed in four corners of the stopper members 51 and 52.

The stopper members 51 and 52 having such shapes have specifically the following configurations. Hereinafter, the stopper member 51 on the left side of the figure will be described as a typical example.

Figure 7:
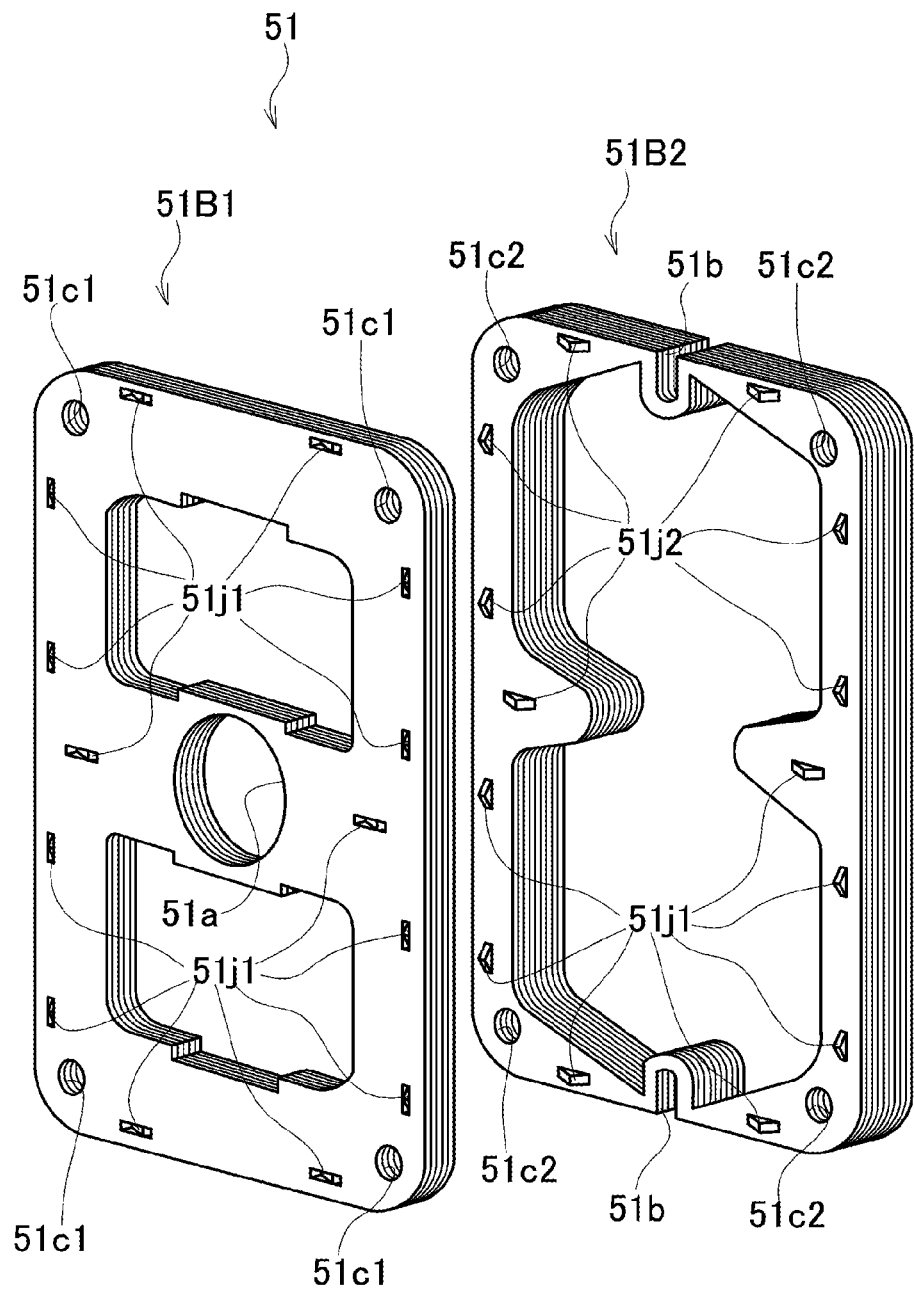
FIG. 7 is an exploded perspective view of a stopper member configuring the linear actuator.

The stopper member 51 has the configuration illustrated in FIG. 7, and is formed by coupling two stopper elements 51B1 and 51B2 in the axial direction. External appearances of the stopper elements 51B1 and 51B2 are substantially formed in the same rectangular shape. The stopper element 51B1 is formed in an "8" shape and the stopper element 51B2 is formed in an "O" shape. The stopper elements 51B1 and 51B2 are formed by laminating thin punched steel plates. Caulking portions 51j1 to 51j1 and 51j2 to 51j2 respectively formed at the thin plates are engaged with each other in the axial direction, so that the thin plates are coupled to each other. The stopper member 51 is configured by the same method as the method of forming the flat springs 41 and 42, the inner core 2, and the outer core 3 illustrated in FIG. 3.

In order not to form the protrusions in the axial direction when the stopper member 51 is assembled as the linear actuator 1, it is considered that the caulking portions 51j1 to 51j1 illustrated in FIG. 7 do not protrude in the left direction of the figure. This method will be described below.

The stopper member 52 (see FIG. 3) is manufactured by the same method as the stopper member 51 described above. However, when the stopper member 51 is assembled as the linear actuator 1 as illustrated in FIG. 3, unlike the stopper member 51, caulking members (see FIG. 7) are formed outside in the axial direction to have a direction where the recesses are formed.

Gaps are configured between inner circumferential surfaces of the holes 51a and 52a formed in the centers of the stopper members 51 and 52 and outer circumferential surfaces of the fixing collar 74 and the large diameter portion 61 of the shaft 6. Further, a resin collar 75 is fitted to an outer circumference of the fixing collar 74 at a position facing the holes 51a and 52a, and a resin collar 76 is fitted to an outer circumference of the large diameter portion 61. As stated above, gaps between the fixing collar 74 and the large diameter portion 61 of the shaft 6 fitted with the resin collars 75 and 76 and the holes 51a and 52a of the stopper members 51 and 52 facing the fixing collar 74 and the large diameter portion 61 are respectively defined as δ2 and δ3 as illustrated in FIG. 2. Meanwhile, gaps between the permanent magnets 23 and 24 and the magnetic pole portions 31a and 32a are defined as δ1. In the present embodiment, δ2 and δ3 are set to have the same dimension, and are also set to be smaller than δ1. Thus, even when there is a relative displacement in the radial direction between the inner core 2 and the outer core 3, before the permanent magnets 23 and 24 and the magnetic pole portions 31a and 32a are in contact with each other, since the resin collars 75 and 76 abut on the inner circumferential surfaces of the holes 51a and 52a of the stopper members 51 and 52 to function as a stopper, it is possible to prevent the permanent magnets 23 and 24 and the magnetic pole portions 31a and 32a from being in contact with each other.

As illustrated in a cross-sectional view of FIG. 9(a) and a perspective view of FIG. 9(b), the resin collars 75 and 76 are attached to the fixing collar 74 and the large diameter portion 61 of the shaft 6. FIG. 9(b) is a schematic view simply illustrating a case where the components such as the inner core 5 and the flat springs 41 and 42 are removed from the shaft 6. Small diameter portions as step portions 74c and 61b are respectively formed at the fixing collar 74 and the large diameter portion 61 of the shaft 6, and the resin collars 75 and 76 are fitted to the small diameter portions.

The resin collars 75 and 76 have the same shape, and are formed in a thin cylindrical shape. Further, cut portions 75a and 76a are formed at the resin collars in the circumferential direction by one. Accordingly, diameters of the resin collars are enlarged from the cut portions, so that the resin collars are fitted to the step portions 74c and 74b. The inner circumferential surfaces of the resin collars come closely in contact with the step portions by restoring force, resulting in the position being fixed. The cut portions 75a and 75b are inclined in relation to the axial direction, and are set to have dimensions such that a part configuring the resin collars 75 and 76 are present even at all locations in the circumferential direction while the resin collars are attached to the step portions 74c and 74b. Thus, even when there is a relative displacement at any direction of the radial direction between the inner core 2 and the outer core 3, the resin collars sufficiently and continuously function as a stopper.

As described above, when the stopper members 51 and 52 are formed to be assembled, the bolt holes 51c to 51c and 52c to 52c formed in the stopper members 51 and 52 are connected to the bolt holes 41g to 41g and 42g to 42g formed in the flat springs 41 and 42 and the bolt holes 31c, 31c, 32c and 32c formed in the outer core 3 in the axial direction. Thus, when the assembling of the stopper members 51 and 52 are completed, the bolts 91 to 91 are inserted and the nuts 92 to 92 are fastened to front ends of the bolts, so that the stopper members 51 and 52, the flat springs 41 and 42, and the outer core 3 can be fastened in the axial direction.

At this time, the protrusions and the recesses configuring the caulking portions 51j, 52j, 41j, 42j, 31j and 32j formed at the stopper members 51 and 52, the flat springs 41 and 42, and the outer core 3 are engaged with each other in the axial direction. Accordingly, the protrusions and the recesses can function as the engagement portions for performing the positioning in the circumferential direction. Further, when the protrusions as the caulking projections are engaged with the recessions as the caulking holes, by applying pressing force to the protrusions and the recesses, small deformation occurs, and fastening force is more strongly generated.

In this way, after performing the fastening in the axial direction, the outer core 3 can be operated with being integrated with the frame bodies 41e and 42e of the flat springs 41 and 42 and the stopper members 51 and 52 to be constituted as the linear actuator 1 illustrated in FIG. 1.

Figure 10:
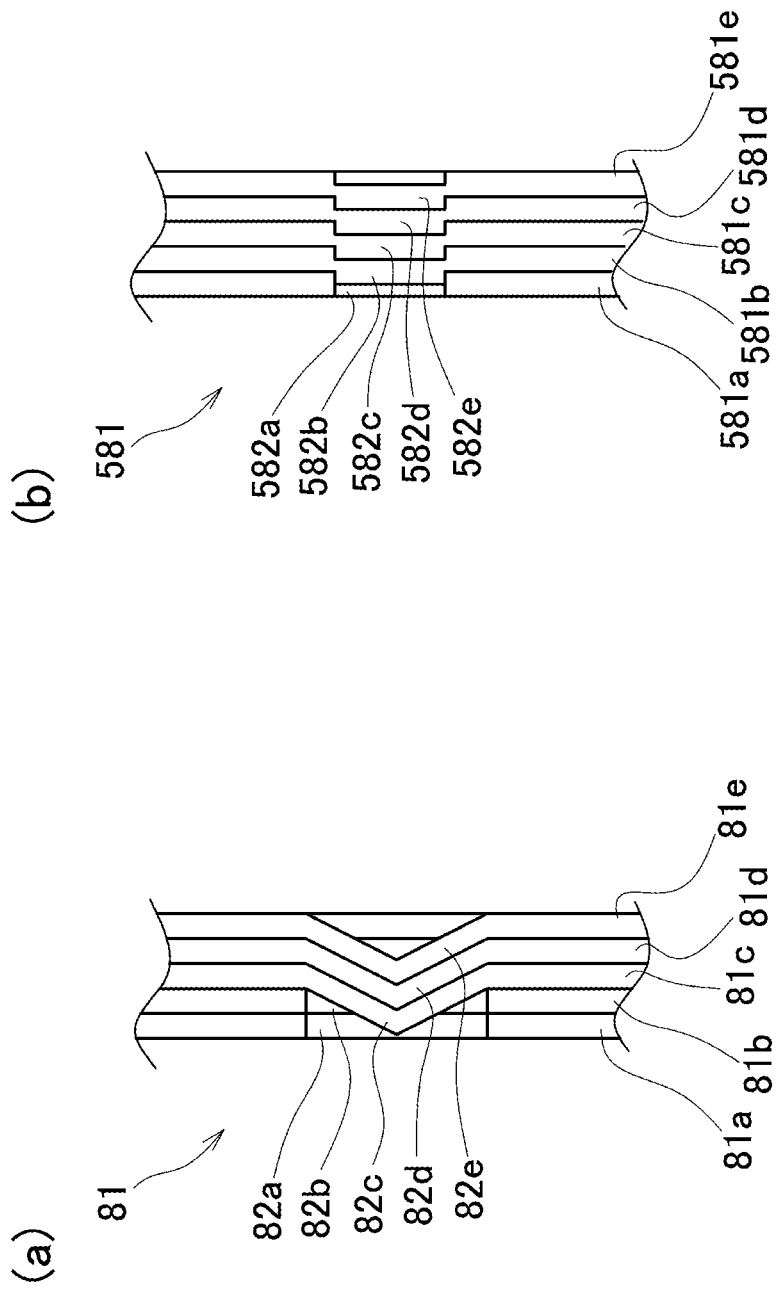
FIGS. 10 (a) and (b) show schematic diagrams of a shape of a caulking portion used in the linear actuator.

Here, a method for mutually coupling the laminated steel plates used to configure the inner core 2, the outer core 3, the spring members 41 and 42, and the stopper members 51 and 52 described above will be described in detail. FIG. 10($a$) is an example schematically illustrating a structure of the caulking portion.

In this example, a case where five thin steel plates 81a to 81e are coupled will be shown. The above-described protrusions as caulking portions 82c to 82e are respectively formed at a part of the thin plates 81c to 81e by press marks. The protrusions are formed by cutting two locations in parallel on a lateral side, namely, in a depth and a front in the figure and deforming portions between the cut portions so as to become a reverse "V"-shaped protrusion toward one side (the left direction of the figure), and function as caulking projection. Since the recesses as the caulking holes are formed in a rear side (the right direction of the figure) of the protrusions, when the thin plates 81c to 81e are overlapped with each other, the caulking portions 82c to 82e are engaged with each other by overlapping the protrusions and the recesses. In addition, in this example, rectangular-shaped openings serving as caulking portions 82a and 82b are formed in the thin plates 82a and 82b as punched holes. It is possible to engage the openings with the protrusions serving as the caulking portions 82c formed at the thin plates 81c by inserting the protrusions into the openings. As stated above, when the caulking portions 82a to 82e are engaged, by being pressed in the laminated direction by a press machine, for example, the caulking portions 82a to 82e are slightly deformed to mutually generate fastening force.

In the configuration example of the caulking portions 82a to 82e, since the caulking portions 82a and 82b of the thin plates 81a and 81b on the left side of the figure are formed as the rectangular-shaped openings, even when the thin plates 81a to 81e are coupled by being laminated, it is possible to prevent protrusions from being formed on the left side of the figure from a front surface of the thin plate 81a. However, the configuration in which a part of the caulking portions 82a and 82b are formed as the openings may not be required to fasten the steel plates, and all the caulking portions can be formed to have the same reverse "V" shape. Among them, the stopper member 51 illustrated in FIG. 3 is formed by the method of forming openings in a part of the caulking portions 82a and 82b, and the stopper member 52, the inner core 2, the outer core 3, and the flat spring 42 are formed such that all the caulking portions are formed in the same reverse "V" shape and protrusions outwards are formed. As stated above, the flat spring 41 is configured such that the protrusions are not formed at only the caulking portions abutting on the disc spring 73 and the protrusions are formed at the other portions.

In this way, it is possible to simply form the respective components by laminating the steel plates provided with the caulking portions serving as the press marks or the punched holes. Further, while these caulking portions as the engagement portions are used to perform the positioning of the respective components, it is possible to exert fastening force between the respective components by being pressed in the laminated direction.

In addition, it is possible to form the caulking portions as illustrated in an example of FIG. 10($b$). In this example, caulking portions 582a to 582e are formed in a circular shape when viewed in the axial direction. The caulking portions are different from the reverse "V"-shaped caulking portions of FIG. 10($a$), and do not have the cut portions on the lateral side. The caulking portions 582a to 582e in FIG. 10($b$) formed at thin plates 581b to 581e are formed as circular-shaped protrusions in the left direction of the figure, and the caulking portions on the rear side, namely, in the right direction of the figure, are formed as circular-shaped recesses. In addition, the caulking portions 582a of the thin plate 581a are formed as the same circular-shaped holes. The caulking portions 582a to 582e are engaged with each other at the time of laminating the thin plates 581a to 581e. Thus, it is possible to mutually generate the fastening force by applying the pressing force in the axial direction.

As described above, the linear actuator 1 having the configuration illustrated in FIGS. 1 and 2 operates as follows. Hereinafter, the description is provided with reference to FIG. 2.

In the present embodiment, since the linear actuator 1 is used by fixing the shaft 6, the inner core 2, which is fitted to the outer circumference (the insertion portion) 64 of the shaft 6 and on which the positioning in the axial direction is performed by the fixing collar 74 and the disc spring 73, functions as a so-called stator. Similarly, the outer core 3, which is provided outside the inner core 2 in the radial direction so as to be disposed on the same axial center by the flat springs 41 and 42 supported by the shaft 6, functions as a moving element. The outer core 3 is elastically supported such that the outer core 3 can be displaced in a plate-thickness direction, namely, in the axial direction of the shaft 6 by the flat springs 41 and 42.

The permanent magnets 23 and 24 are provided at the top and bottom of the inner core 2 in the figure, and the magnetic pole portions 31a and 32a are provided at the inner surface of the outer core 3 so as to face the permanent magnets 23 and 24. The gaps δ1 are formed between the permanent magnets 23 and 24 and the magnetic pole portions 31a and 32a. As described above, the permanent magnets 23 and 24 are arranged such that magnetic poles thereof are different from each other in the axial direction, and a magnetic field is generated around the magnetic poles. Positional relations between the permanent magnets 23 and 24 and the magnetic pole portions 31a and 32a are an important factor for deciding the characteristics of the linear actuator 1, and when there is a positional deviation in the circumferential direction between the flat springs 41 and 42 and the inner core 2, a decrease in efficiency is caused.

In the present embodiment, at least two or more engagement portions including the recesses and the protrusions are arranged at the abutting portions formed by allowing facing surfaces of the respective components to abut each other in the axial direction. Thus, it is possible to suppress the positional deviation in the circumferential direction. Furthermore, the fixing collar 74 is forcibly pressed in the axial direction, it is possible to perform the assembling without applying force toward the circumferential direction, so that the positional deviation can be further prevented. With this configuration, the positional relations between the permanent magnets 23 and 24 and the magnetic pole portions 31a and 32 are appropriately maintained, so that the characteristics of the device are not deteriorated. In addition, since the recesses and the protrusions are formed as the caulking holes and the caulking projections, by pressing toward the axial direction at the time of assembling, it is possible to exert the fastening force between the respective components. With this configuration, the urging force is constantly exerted toward the axial direction by the disc spring 73, and thus, the engagement portions including the recesses and the protrusions can be more strongly maintained in the engagement state.

By applying current to the coils 25 and 26 formed so as to be wound around the inner core 2, it is possible to generate deflection of the magnetic field in the axial direction. When current is not applied, the magnetic pole portions 31a and 32a are arranged so as to face the centers of the permanent magnets 23 and 24 in the axial direction. By applying current to generate the deflection of the magnetic field, it is possible to exert thrust in the axial direction to the magnetic pole portions 31a and 32a. By doing this, it is possible to displace the outer core 3 in the axial direction, and by changing current, normally and reversely, in a sinusoidal shape, it is possible to vibrate the outer core 3 with an arbitrary acceleration and frequency. The linear actuator can be used as an active damper by using such a function.

When such a linear actuator 1 is used at the place with drastic changes in temperature, generally, the characteristics of the linear actuator may be changed due to a dimensional change, toward the axial direction, of the shaft 6. Specifically, a temperature of the shaft 6 increases more than other members, so that the shaft 6 may be relatively extended. Otherwise, the temperature of the shaft 6 decreases more greatly than other members, so that the fixing collar 74 is pushed out in the axial direction. As a result, the positional deviation of the shaft 6 may be caused in the left direction of the figure. In such cases, a dimension between the end surface 74b of the fixing collar 74 and the end surface 61a of the large diameter portion 61 is relatively increased with respect to other members. At this time, gaps in the axial direction may occur with respect to the inner core 2, the flat springs 41 and 42, and the spacers 71 and 72 that are attached to the outer circumference of the shaft. Further, the fixing of the flat spring 41 is weakened, so that a length of the spring is visibly increased to cause a change in the supporting condition of the outer core 3. However, in the linear actuator 1 of the present embodiment, since the compressed disc spring 73 is provided to be adjacent to the fixing collar 74, an influence due to a slight dimension change of the shaft 6 or the positional deviation of the fixing collar 74 is absorbed to compression allowance of the disc spring 73, so that the urging force is always exerted in the axial direction to the inner core 2, the flat springs 41 and 42, and the spacers 71 and 72 in which positions thereof are restricted between the end surface 74b of the fixing collar 74 and the end surface 61a of the large diameter portion 61. Thus, the gaps occur in the axial direction of the shaft 6, or the supporting condition of the outer core 3 is changed, so that the characteristics of the linear actuator 1 do not change.

In addition, as described above, when the length of the shaft 6 is relatively reduced with respect to the inner core 2, the position of the fixing collar 74 is deviated, so that it is possible to suppress excessive stress to the shaft 6 or the inner core 2, for example, from being exerted. As a result, it is possible to prevent the respective components from being damaged.

Moreover, in order to improve efficiency by increasing thrust by the same power, by decreasing the gaps δ1 between the permanent magnets 23 and 24 and the magnetic pole portions 31a and 32a, magnetic flux leakage needs to be reduced. However, in such a method, the permanent magnets 23 and 24 and the magnetic pole portions 31a and 32a may collide each other. Since the permanent magnets 23 and 24 are generally made from a brittle material, the permanent magnets 23 and 24 may be damaged due to the collision with the magnetic pole portions 31a and 32a, so that the permanent magnets 23 and 24 may become not operational. Furthermore, when the gaps δ1 is sufficiently large, the permanent magnets 23 and 24 do not in contact with the magnet pole portions 31a and 32a. Even in such a case, when the relative displacement in the radial direction is excessively large, the flat springs 41 and 42 are plastically deformed, or are damaged. Thus, the flat springs do not function as effective springs, so that characteristics required as the linear actuator 1 may not exhibit.

In order to prevent such a problem, in the linear actuator 1 of the present embodiment, δ1 is set to be a small dimension to improve efficiency. Further, the stopper members 51 and 52 are provided in the front and rear in the axial direction the inner circumferential surfaces of the holes 51a and 52a formed at the axial centers of the stopper members 51 and 52 and the outer circumferential surface of the fixing collar 47 and the large diameter portion 61 of the shaft 6 come in contact with each other to function as a stopper before the permanent magnets 23 and 24 and the magnetic pole portions 31a and 32a come in contact with each other. Accordingly, the gaps δ2 and δ3 between the inner circumferential surfaces of the holes 51a and 52a and the outer circumferential surfaces of the fixing collar 74 and the large diameter portion 61 of the shaft 6 are set to be smaller than the δ1. In addition, the gaps δ2 and δ3 are set to be sufficiently small in order to prevent the damage and deformation of the flat springs 41 and 42.

As described above, the fixing collar 74 and the large diameter portion 61 can serve as a base point for exerting the urging force of the disc spring 73 while performing the position restriction of the inner core 2, the flat springs 41 and 42 between the respective end surfaces 74b and 61a, and the spacers 71 and 72, and also serve as a stopper for preventing the permanent magnets 23 and 24 and the magnetic pole portions 31a and 32a from being in contact with each other. Therefore, it is possible to obtain a compact linear actuator having a simple configuration.

Furthermore, since the resin collars 75 and 76 are fitted to the outer circumferences of the fixing collar 74 and the large diameter portion 61, when the fixing collar and the large diameter portion serve as a stopper, the resin collars 75 and 76 come in contact with the inner circumferential surfaces of the holes 51a and 52a of the stopper members 51 and 52. Thus, the collision at the time of abutting can be absorbed by a resin material, so that it is possible to suppress noise from being caused. Further, the fixing collar 74 and the large diameter portion 61 serve as a sliding bearing while abutting, so that sliding resistance is reduced to cause the relative displacement in the axial direction. As a result, it is possible to continue the movement in the axial direction of the outer core 3 while exhibiting a stopper function. In addition, the shaft 6 and the fixing collar 74 are made from metal and the thin resin collars 75 and 76 are merely provided at the shaft 6 and the fixing collar 74, so that it is possible to exhibit the aforementioned effects. Accordingly, it is possible to simply provide the resin collars combined with the configuration in which their diameters are freely enlarged. Furthermore, it is possible to uniformly form the gaps δ2 and δ3 over the entire circumference with good accuracy.

As described above, the linear actuator 1 of the present invention includes the inner core 2, the pair of flat springs 41 and 42 that is provided so as to interpose the inner core 2 from front and rear of the inner core 2 in the axial direction, and the outer core 3 that is provided outside the inner core 2 in the radial direction so as to be disposed on the same axial center as the inner core 2 while being supported by the pair of flat springs 41 and 42. The permanent magnets 23 and 24 are provided at the inner core 2, and the magnetic pole portions 31a and 32a facing the permanent magnets 23 and 24 with predetermined gaps formed therebetween are provided at the outer core 3. The spacers 71 and 72 are respectively provided between the inner core 2 and the flat springs 41 and 42, and facing surfaces of the spacers 71 and 72 and the inner core 2 abut in the axial direction to form an abutting portion and facing surfaces of the spacers 71 and 72 and the flat springs 41 and 42 adjacent to the spacers 71 and 72 abut in the axial direction to form an abutting portion. Furthermore, a plurality of engagement portions including the recesses formed at one of the facing surfaces configuring the abutting portions and the protrusions formed at the other thereof are respectively arranged at the abutting portions.

In such a configuration, it is possible to decide relative positions by merely assembling the inner core 2, the spacers 71 and 72, and the flat springs 41 and 42 in the axial direction while engaging the recesses and the protrusions formed at the facing surfaces thereof. Thus, the positional deviations in the circumferential direction are not caused. For this reason, without using a shaft on which special machining for forming a key groove or a plane surface has been performed, the relative positions of the inner core 2 and the outer core 3 supported by the flat springs 41 and 42 are not deviated in the circumferential direction. Thus, the magnetic pole portions 31a and 32a and the permanent magnets 23 and 24 can appropriately face each other, and the respective components can be prevented from being contacted within the linear actuator. Accordingly, it is possible to inexpensively provide the linear actuator 1 without causing a decrease in efficiency and a breakdown.

Further, at least any one of the spacers and the inner core are integrally formed, so that it is possible to reduce the number of components, and to easily manage and assemble the components.

Furthermore, the protrusions and the recesses of the engagement portions are respectively formed of the caulking projections and the caulking holes. While the protrusions and the recesses are engaged with each other, the protrusions and the recesses are pressed in the axial direction to allow positions of the protrusions and the recesses to be mutually fixed. Thus, when the positions of the inner core 2, the flat springs 41 and 42, and the spacers 71 and 72 are adjusted once, it is possible to fasten the respective components without causing the positional deviations in the circumferential direction at the assembling process. As a result, it is possible to easily assemble the components.

In addition, the inner core 2, the flat springs 41 and 42, and the spacers 71 and 72 are formed by laminating the steel plates. Since the press marks or the punched holes corresponding to the caulking projections and the caulking holes are formed at a part of the steel plates, it is possible to form the respective components by a simple machining method, so that manufacturing cost can be further reduced.

Moreover, the linear actuator 1 of the present invention includes the inner core 2, the pair of flat springs 41 and 42 that is provided so as to interpose the inner core 2 from front and rear of the inner core 2 in the axial direction, and the outer core 3 that is provided outside the inner core 2 in a radial direction so as to be disposed on the same axial center as the inner core 2 while being supported by the pair of flat springs 41 and 42. The permanent magnets 23 and 24 are formed at the inner core 2, and the magnetic pole portions 31a and 32a are formed at the outer core 3 to face the permanent magnets 23 and 24 with predetermined gaps formed therebetween. The through holes 2a, 41a, and 42a are formed in the inner core 2 and the pair of flat springs 41 and 42 at positions of the same axial center. The shaft 6 having the large diameter portion 61 formed at one end 63 is closely inserted into the through holes 2a, 41a, and 42a from the other end 62, and the fixing collar 74 is forcibly pressed into the other end 62 protruding through the through holes 2a, 41a and 42a in the axial direction, the spring member 73 is provided between the flat spring 41 and the fixing collar 74, and positions of the inner core 2 and the pair of flat springs 41 and 42 are restricted while applying urging force in the axial direction of the shaft 6 by the spring member 73 between the larger diameter portion 61 and the fixing collar 74.

In such a configuration, it is possible to simply assemble the components without causing the positional deviation in the circumferential direction between the inner core 2 and the flat springs 41 and 42. Further, even when the shaft 6 is extended by heat or the position of the fixing collar 74 is deviated in the axial direction, the urging force is exerted by the spring member 73 to consistently press the flat springs 41 and 42 and the inner core 2 in the axial direction. Thus, the gaps therein in the axial direction are not caused, and the supporting condition of the outer core 3 is not changed by the flat springs 41 and 42. Accordingly, it is possible to stably use the linear actuator 1 without changing characteristics of the linear actuator 1 even when used under harsh conditions with drastic changes in temperature.

In addition, the spring member 73 includes a disc spring. Since the inner circumference of the disc spring 73 is fitted to the outer circumference of the shaft 6, the pressing force in the axial direction acting on the flat springs 41 and 42 and the inner core 2 can be uniformly generated in the circumferential direction of the shaft 6. Thus, it is possible to more stably support the flat springs 41 and 42, and to stabilize more the characteristics of the linear actuator 1.

In addition, the outer core 3 includes the stopper members 52 and 51 at positions corresponding to the large diameter portion 61 of the shaft 6 and the fixing collar 74 on both sides in the axial direction. The stopper members 52 and 51 are provided with holes 52a and 51a arranged with predetermined gaps formed between the stopper members 51 and 52 and the outer circumferences of the large diameter portion 61 and the fixing collar 74, and the predetermined gaps are smaller than gaps between the permanent magnets 23 and 24 and the magnetic poles 31a and 32a. Thus, the same portion has the positioning function in the axial direction and the stopper function in the radial direction, so that it is possible to simply configure the compact linear actuator 1 without causing the damage of the flat springs 41 and 42 and the permanent magnets 23 and 24 while exhibiting the aforementioned effect.

Furthermore, the resin collars 76 and 75 are formed at the outer circumferences of the large diameter portion 61 and the fixing collar 74, and thus, even when the resin collars function as the stoppers in the radial direction, it is possible to absorb the collision at the time of being contacted and possible to reduce sliding resistance. Accordingly, it is possible to continuously perform relative operations of the inner core 2 and the outer core 3.

Moreover, the cut portion 75a and 76a are formed at one location of the resin collars 75 and 76 in the circumferential direction to enlarge the diameters of the resin collars, and the cut portions 75a and 76a are inclined in relation to the axial direction. Further, at least a part configuring the resin collars 75 and 76 is present at all locations in the circumferential direction. Thus, the resin collars 75 and 76 having the effect can be simply attached, and it is possible to reliably exhibit the stopper function even when there is a displacement between the inner core 2 and the outer core 3 in any direction of the radial direction.

Second Embodiment

Figure 12:
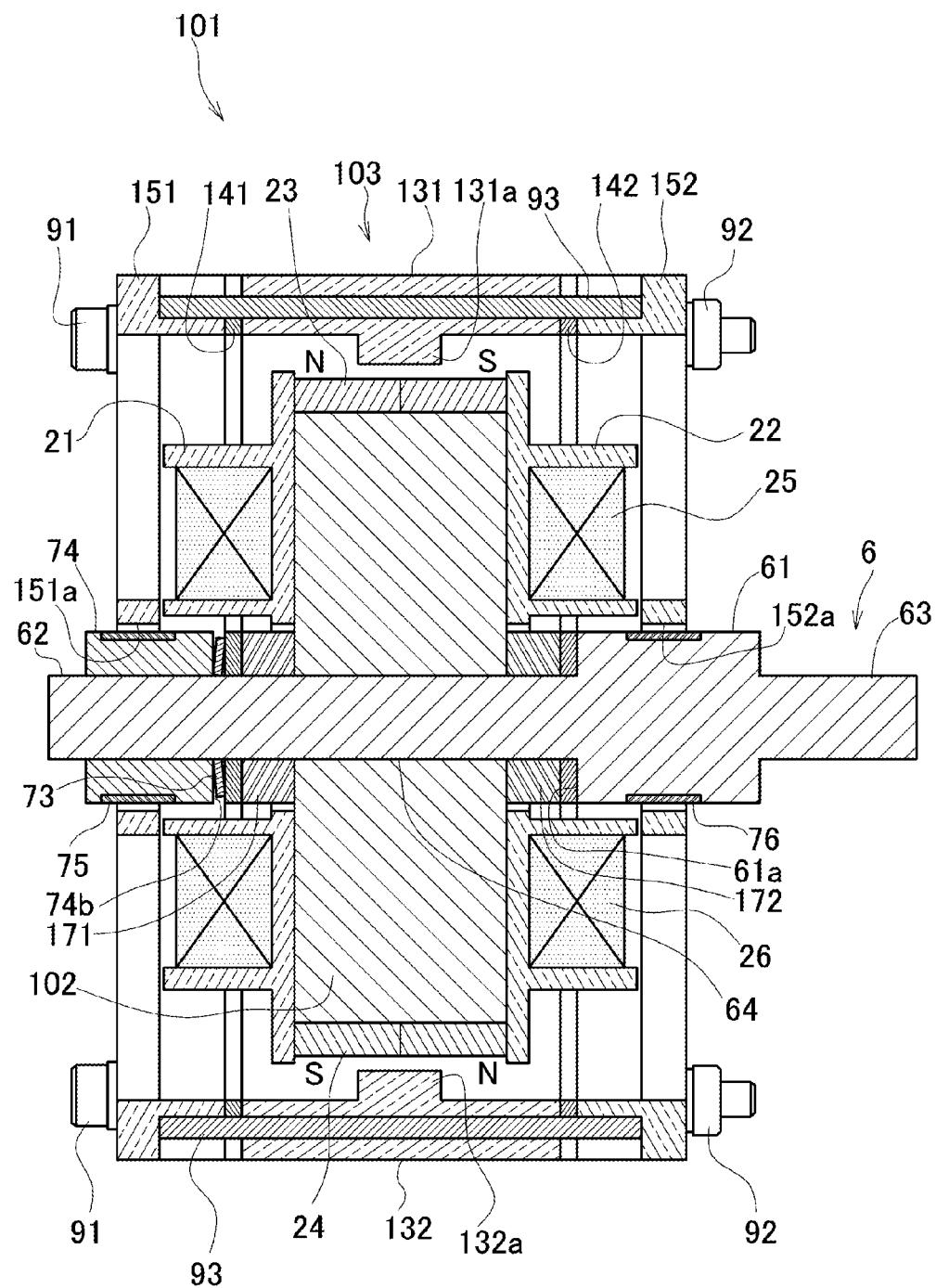
FIG. 12 is a cross-sectional view of a linear actuator according to a second embodiment of the present invention.

FIG. 12 is a cross-sectional view of a linear actuator 101 according to a second embodiment of the present invention, and same reference numerals are assigned to portions in common with the first embodiment.

In this embodiment, the number of caulking portions formed at an inner core 102, spacers 171 and 172, flat springs 141 and 142, an outer core 103, and stopper members 151 and 152 is less than that in the first embodiment. Thus, there is an advantage in that it is possible to improve yield at the time of machining.

Figure 13:
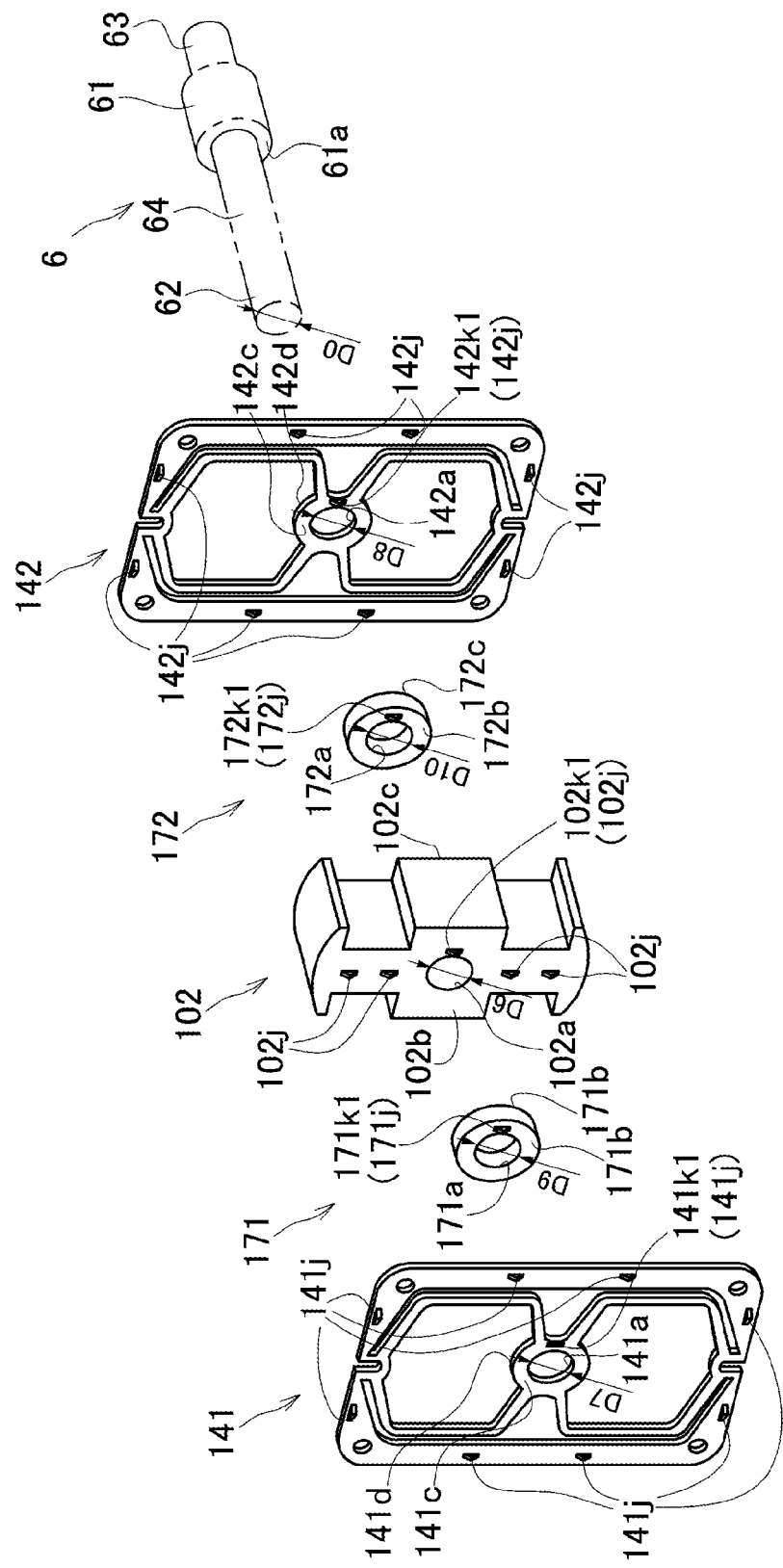
FIG. 13 is an exploded perspective view of a major part illustrating engagement relations between components of the linear actuator.

Specific positional relations of the caulking portions are represented in FIG. 13, and caulking portions 102k1, 171k1, 141k1, and 142k1, which are respectively formed at one location near through holes 102a, 171a, 172a, 141a, and 142a, serve as engagement portions between the inner core 102, the spacers 171 and 172, and the flat springs 141 and 142.

In the present embodiment, inner diameters D6 to D10 of the through holes 102a, 141a, 142a, 171a, and 172a of the inner core 102, the flat springs 141 and 142, and the spacers 171 and 172 are all substantially equal to an outer diameter D0 of the insertion portion 64 of the shaft 6, and are formed to be inserted into the shaft 6 smoothly and closely. Accordingly, positions of the inner core 102, the flat springs 141 and 142, and the spacers 171 and 172 are restricted in the radial direction by the shaft 6, and the inner core 102, the flat springs 141 and 142, and the spacers 171 and 172 have the same axial center.

Therefore, the inner core 102, the flat springs 141 and 142, and the spacers 171 and 172 have the engagement portions at only one location of abutting portions formed by facing surfaces of the inner core 102, the flat springs 141 and 142, and the spacers 171 and 172. However, since the position restriction is performed at two locations by performing the position restriction by the shaft 6, it is possible to reliably perform the position restriction in the circumferential direction, similarly to the first embodiment.

Naturally, it may be configured such that a plurality of engagement portions are arranged at the abutting portion, and cooperation of the engagement portions allows for the position restriction.

As described above, the linear actuator 101 of the present invention includes the inner core 102, the pair of flat springs 141 and 142 that is provided to interpose the inner core 102 from the front and rear of the inner core in the axial direction, and the outer core 103 that is provided outside the inner core 102 in the radial direction so as to be disposed on the same axial center as the inner core 102 while being supported by the pair of flat springs 141 and 142. The permanent magnets 23 and 24 are provided at the inner core 102, and the magnetic pole portions 131a and 132a facing the permanent magnets 23 and 24 are formed at the outer core 103 with predetermined gaps formed therebetween. The through holes 102a, 141a, and 142a are formed in the inner core 102 and the pair of flat springs 141 and 142 at positions of the same axial center. The linear actuator includes the shaft 6 closely inserted into the through holes 102a, 141a, and 142a and the spacers 171 and 172 that are closely fitted into the outer circumference of the shaft 6 and are respectively arranged between the inner core 102 and the flat springs 141 and 142. The facing surfaces of the spacers 171 and 172 and the inner core 102 abut each other in the axial direction, and the facing surfaces of the spacers 171 and 172 and the flat springs 141 and 142 adjacent to the spacers 171 and 172 abut each other in the axial direction, thereby forming the abutting portions. Further, the engagement portions including the recesses formed at one of the facing surfaces of the abutting portions and the protrusions formed at the other thereof are provided at least one location.

In such a configuration, the inner core 102, the spacers 171 and 172, and the flat springs 141 and 142 are merely fitted to the outer circumference of the shaft 6 while the recesses and the protrusions formed at the facing surfaces are engaged with each other, so that the positions thereof can be relatively decided. As a result, the positional deviation in the circumferential direction is not caused. For this reason, although special machining is not performed on the shaft 6, the relative positions of the inner core 102 and the outer core 103 supported by the flat springs 141 and 142 are not deviated in the circumferential direction, so that it is possible to allow the magnetic pole portions 131a and 132a to face appropriately to the permanent magnets 23 and 24. Further, it is possible to prevent the respective components from being in contact with each other in the linear actuator. Accordingly, it is possible to inexpensively provide the linear actuator 101 without causing a decrease in efficiency or a breakdown.

Third Embodiment

Figure 14:
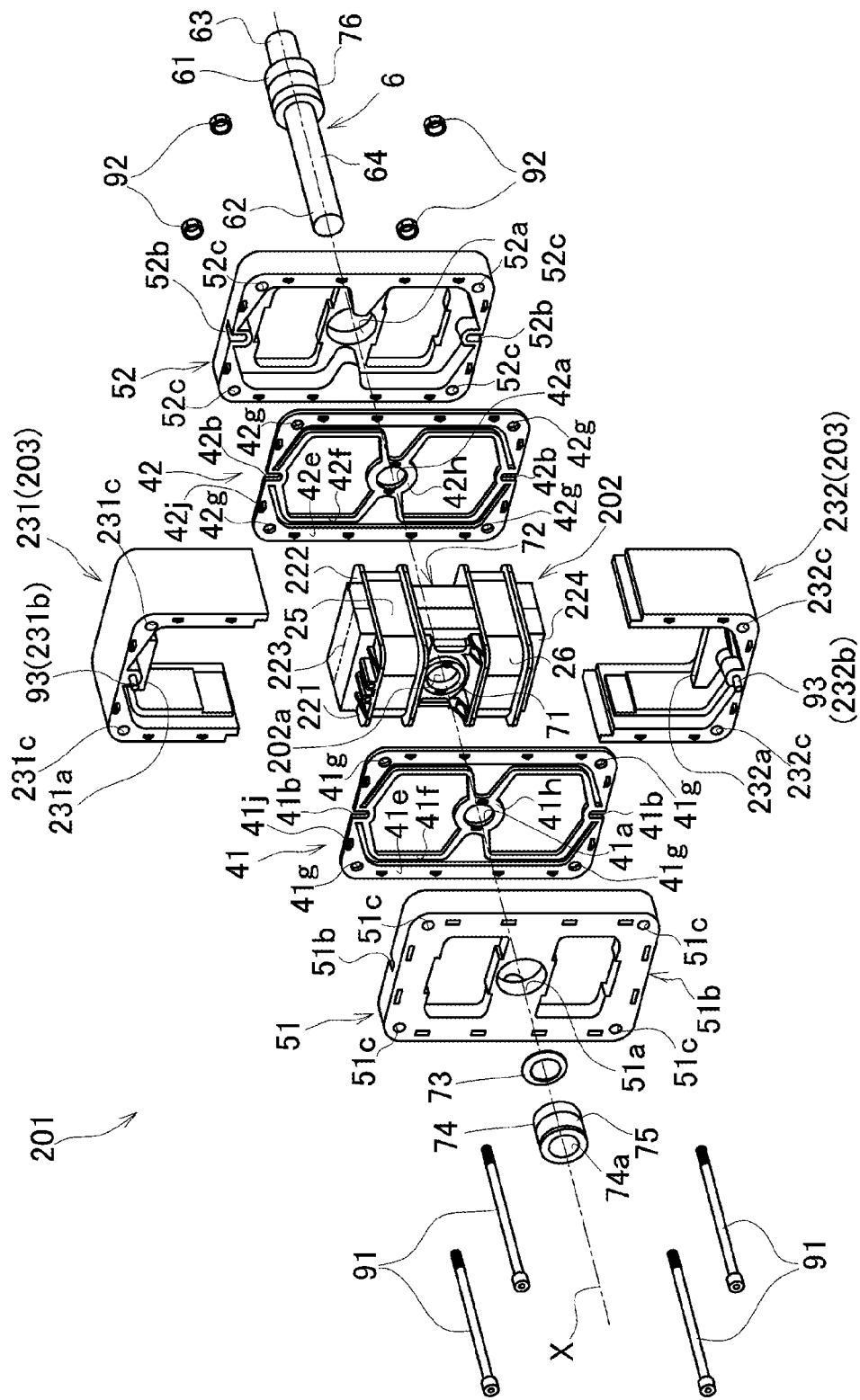
FIG. 14 is an exploded perspective view of a linear actuator according to a third embodiment of the present invention.

FIG. 14 is an exploded perspective view of a linear actuator 201 according to a third embodiment of the present invention, and the same reference numerals are assigned to portions in common with the first embodiment and the second embodiment.

This embodiment has basically the configuration of the first embodiment. In this embodiment, permanent magnets 223 and 224 are formed in a flat plate shape, core covers 221 and 222 and an inner core 202 to which the permanent magnets 223 and 224 are attached are changed in a shape corresponding to the permanent magnets 223 and 224. In addition, surfaces of magnetic pole portions 231a and 232a facing the permanent magnets 223 and 224 are also flattened to correspond to the permanent magnets 223 and 224.

As described above, by configuring the permanent magnets 223 and 224 in such a flat plate shape, it is possible to easily machine the permanent magnets 223 and 224. Furthermore, since it is possible to reduce portions to be removed at the time of machining, manufacturing cost of the permanent magnets 223 and 224 can be reduced. In general, a special material used for the permanent magnet is expensive, and machining cost is expensive due to a difficulty in machining. Such expenses account for a large percentage of manufacturing cost of the entire linear actuator. Thus, it is possible to achieve the great reduction effect on cost due to the flattening of the permanent magnets.

In general, when the permanent magnets 223 and 224 are flattened, since gaps between the permanent magnets 223 and 224 and the magnetic pole portions 231a and 232a are greatly changed by slight positional deviations of the inner core 202 and the outer core 203 in the circumferential direction, the characteristics are easy to change, so that the assembling is difficult.

In this regard, similarly to the first embodiment, in the present embodiment, since the positional deviation in the circumferential direction is not caused by allowing the recesses and the protrusions as the caulking portions respectively formed at the inner core 202, the spacers 71 and 72, and the flat springs 41 and 42 to be engaged with each other, the inner core 202, the spacers 71 and 72, and the flat springs 41 and 42 are formed so as not to cause the positional deviation in the circumferential direction between the outer core 203 and the inner core 202 that are positionally restricted in the circumferential direction while being supported by the flat springs 41 and 42. Accordingly, the permanent magnets 223 and 224 can be flattened, so that it is possible to obtain the cost reduction effect.

The specific configurations of the respective components are not limited to the first to third embodiments.

Figure 9:
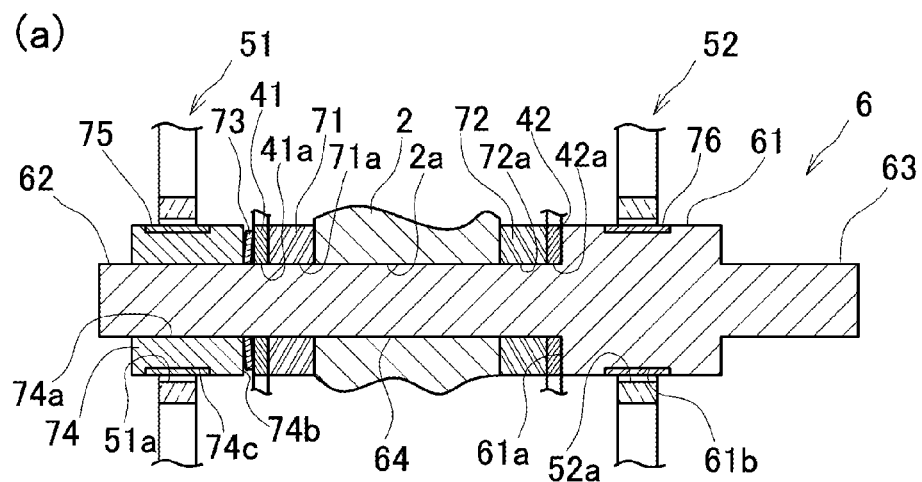
FIGS. 9 (a) and (b) show explanatory diagrams illustrating a configuration of the major part of the linear actuator.
Figure 9:
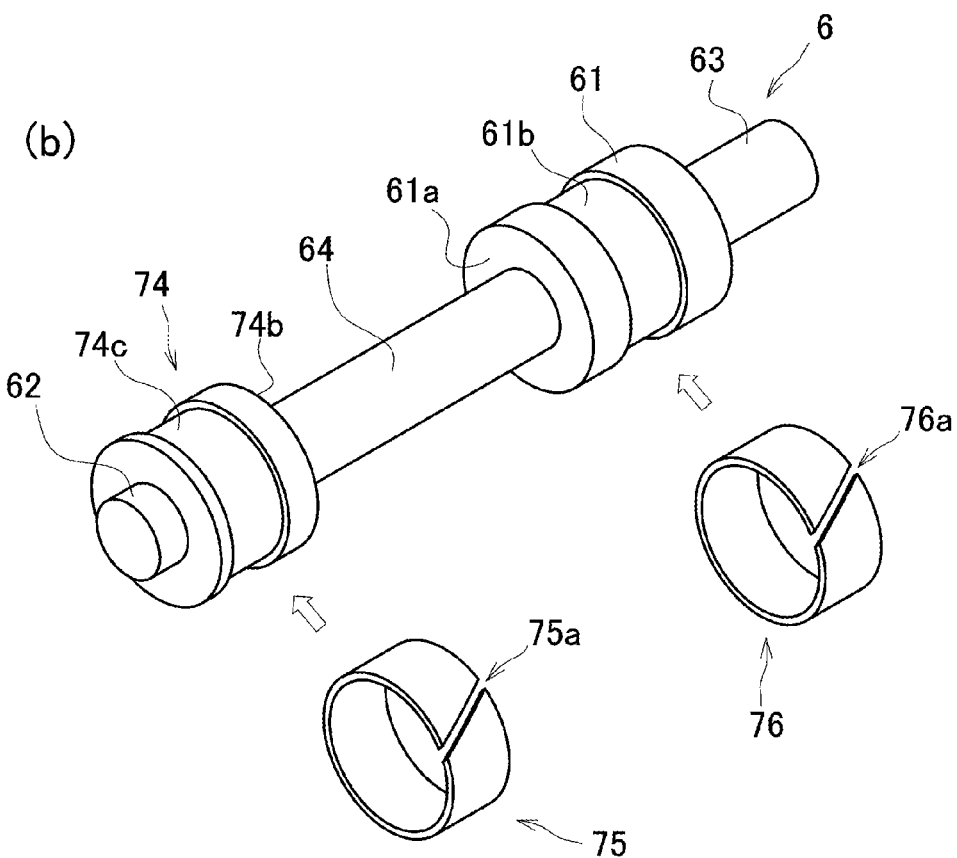
Figure 15:
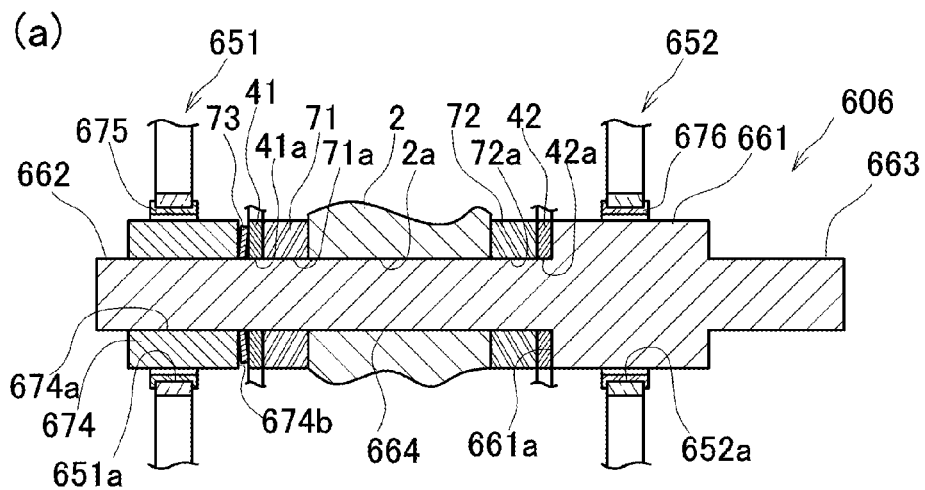
FIGS. 15 (a) and (b) show explanatory diagrams illustrating a modification of a stopper member and a resin collar.
Figure 15:
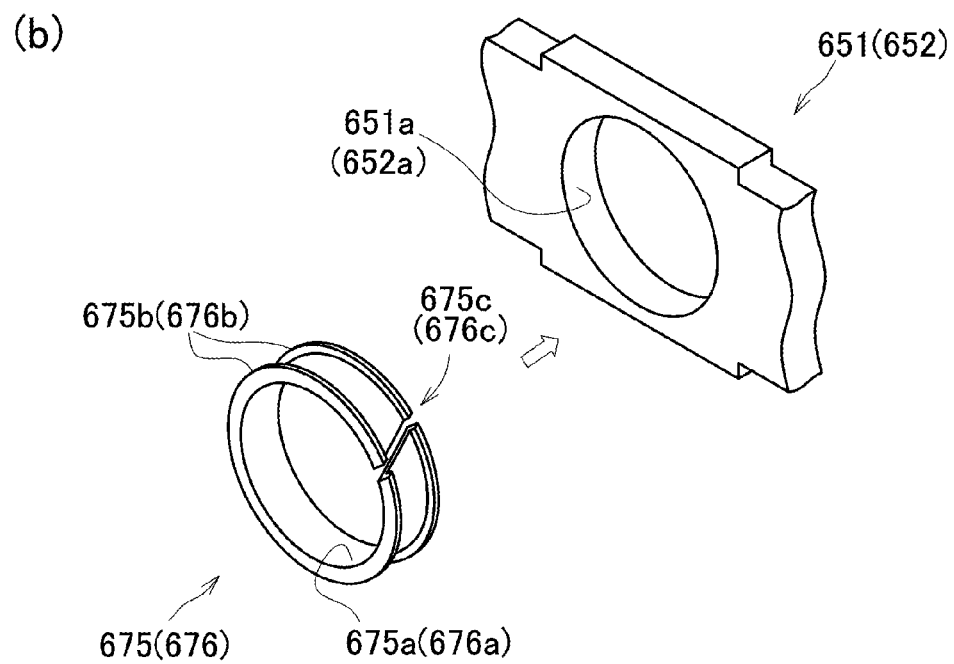

For example, the resin collars 75 and 76 described with reference to FIG. 9 are not limited to this example. As illustrated in a cross-sectional view of FIG. 15(a) and a perspective view of FIG. 15(b), the resin collars can be modified such that the resin collars are arranged at holes 651a and 652a side of stopper members 651 and 652. Also by doing this, it is possible to obtain the same effect as the aforementioned effect capable of reducing sliding resistance and softening collision at the time of contacting between the holes 651a and 652a and the fixing collar 674 and between the holes 651a and 652a and a large diameter portion 661 of a shaft 606. In such a case, configuration is such that a dimension of a resin collar 675 (676) is set to be longer in the axial direction than a plate thickness of the stopper member 651 (652), and brim portions 675b and 675b (676b and 676b) are formed at both ends of the resin collar in the axial direction, and further, a cut portion 675c (676c) is formed at a part of the resin collar in the circumferential direction. After the resin collar is deformed so as to reduce its diameter by the cut portion 675c (676c), the resin collar is inserted into the hole 651a (652a), and then comes in closely contact with an inner circumferential surface of the hole 651a (652a) by restoring force. After the resin collar is attached in such a manner, the position of the resin collar in the axial direction is restricted by the brim portions 675b and 675b (676b and 676b).

Figure 16:
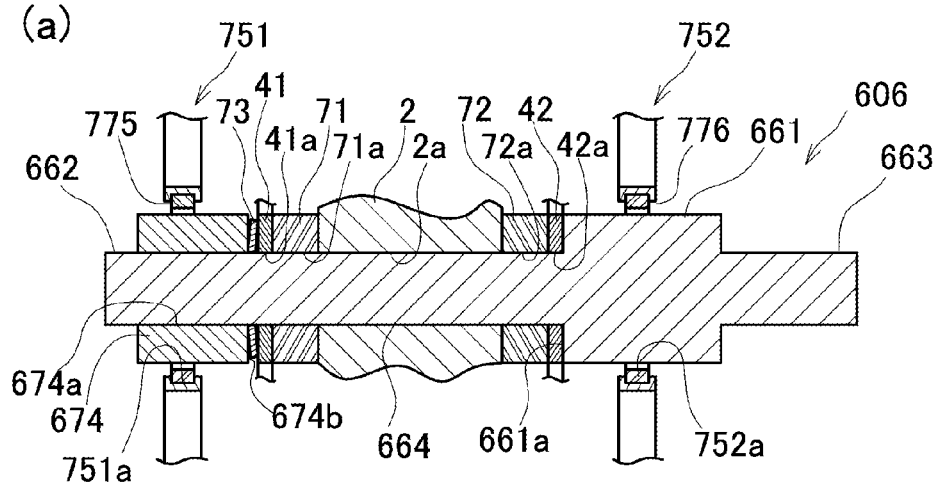
FIGS. 16 (a) and (b) show explanatory diagrams illustrating another modification of the stopper member and the resin collar other than those in FIG. 11.
Figure 16:
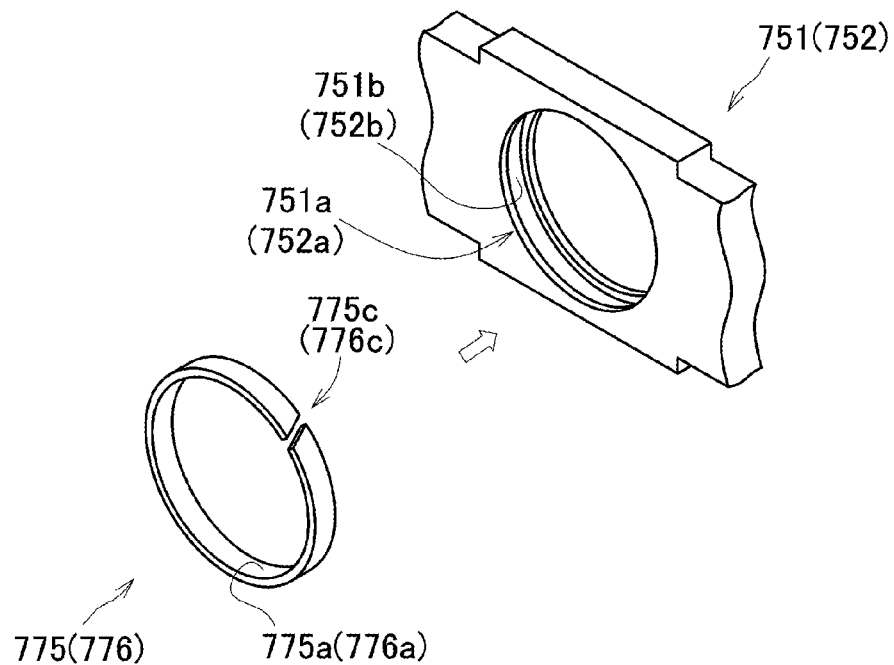

Moreover, it may be possible to configure a resin collar 775 (776) as illustrated in a cross-sectional view of FIG. 16(a) and a perspective view of FIG. 16(b). In this case, the resin collar 775 (776) is formed in a simple ring shape having a cut portion 775c (776c) formed in a part of the resin collar. Furthermore, a hole 751a (752a) formed in a stopper member 751 (752) is provided internally with a concentric groove 751b (752b), and the resin collar 775 (776) is inserted so as to be settled in the groove 751b (752b). When the grooves serve as a stopper, an inner surface of the resin collar 775 (776) abuts on the fixing collar 674 and the large diameter portion 661 of the shaft 606.

Further, in the aforementioned embodiments, the inner core 2 (102, 202) serves as a stator and the outer core 3 (103, 203) serves as a moving element, but such a configuration may be reversed.

In the above-described embodiments, the permanent magnets 23 (223) and 24 (224) and the coils 25 and 26 are provided at the inner core 2 (102, 202), and the magnetic pole portions 31a (131a, 231a) and 32a (132a, 232a) are formed at the outer core 3 (103, 203). However, such a configuration may be reversed.

In addition, in the aforementioned embodiments, although the insertion portion 64 (164) of the shaft 6 (106) has a circular cross section, the insertion portion 64 (164) is not limited to such a circular cross section as long as the inner core 2 and the outer core 3 can be supported to be disposed on the same axial center and the fixing collar 75 (175, 275) can be forcibly pressed after the disc spring 73 is fitted. Specifically, a plane surface may be partially formed at the outer circumference of the insertion portion 64 (164), or the insertion portion 64 (164) may have an elliptical cross section or a polygonal cross section. Furthermore, the insertion portion 64 (164) to which the inner core 2, the spacers 71 and 72, the flat springs 41 and 42, the disc spring 73, and the fixing collar 75 (175, 275) are fitted does not need be formed so as to have the same outer diameter or cross sectional shape over in the entire longitudinal direction. The insertion portion 64 (164) may have a different outer diameter or cross sectional shape depending on a portion to which the respective components are attached as long as the respective components to be fitted to the outer circumference of the insertion portion 64 (164) can be supported so as to be disposed on the same axial center and the pressing force can be sequentially applied in the axial direction between the components.

In addition, in the above-described embodiments, although the disc spring 73 serving as the spring member is attached between the fixing collar 74 (174) and the flat spring 41 (141), the disc spring 73 may be formed at any position between the large diameter portion 61 of the shaft 6 and the fixing collar 74 as long as the urging force can be exerted in the axial direction. For example, it is preferable to form the disc spring 73 between the large diameter portion 61 of the shaft 6 and the flat spring 42 (142). Furthermore, the disc spring 73 may be attached both between the fixing collar 74 and the flat spring 41 (141) and between the large diameter portions 61 and the flat spring 42 (142).

Various other changes may be applied to other configurations without departing from the spirit and scope of the present invention.

INDUSTRIAL APPLICABILITY

According to the first invention described above in detail, it is possible to inexpensively provide a linear actuator with which it is possible to allow internal permanent magnets and magnet pole portions to appropriately face each other and exhibit stable characteristics without a decrease in efficiency or a breakdown since positional deviations between components are not caused while having a simple configuration capable of being easily assembled. In addition, according to the second invention, it is possible to provide a linear actuator with which it is possible to simply perform assembling without causing a positional deviation in a circumferential direction between an inner core and an outer core and to maintain stable operational characteristics since a supporting condition of the outer core does not change without forming internal gaps even under the environment with drastic changes in temperature.

The invention claimed is:

1. A linear actuator including
an inner core;
a pair of flat springs provided so as to interpose the inner core from front and rear of the inner core in an axial direction; and
an outer core that is provided outside the inner core in a radial direction so as to be disposed on the same axial center as the inner core while being supported by the pair of flat springs,
permanent magnets being formed at one of the inner core and the outer core, and magnetic pole portions being formed at the other of the inner core and the outer core to face the permanent magnets with predetermined gaps formed therebetween,
wherein through holes are formed in the inner core and the pair of flat springs at positions of the same axial center, a shaft having a large diameter portion formed at one end is closely inserted into the through holes from the other end, and a fixing collar is forcibly pressed into the other end protruding through the through holes in the axial direction,
wherein a spring member is provided at least one of between any one of the pair of flat springs and the large diameter portion, and between any one of the pair of flat springs and the fixing collar,
wherein positions of the inner core and the pair of flat springs are restricted while applying urging force in the axial direction of the shaft by the spring member between the larger diameter portion and the fixing collar,
wherein the outer core includes stopper members at positions corresponding to the large diameter portion of the shaft and the fixing collar on both sides in the axial direction, the stopper members are provided with holes arranged with predetermined gaps formed between the stopper members and outer circumferences of the large diameter portion and the fixing collar, and the predetermined gap is smaller than a gap between the permanent magnet and the magnetic pole portion,
wherein a resin collar is provided at least any one of the outer circumferences of the large diameter portion and the fixing collar and inner circumferences of the stopper members corresponding to the outer circumferences.

2. The linear actuator according to claim 1, wherein
the spring member includes a disc spring, and an inner circumference of the disc spring is fitted to an outer circumference of the shaft.

3. The linear actuator according to claim 1, wherein
a cut portion is formed at one location of the resin collar in a circumferential direction to increase or decrease a diameter of the resin collar, the cut portion is inclined in relation to the axial direction, and at least a part configuring the resin collar is present at all locations in the circumferential direction.

* * * * *